(12) United States Patent
Mattausch et al.

(10) Patent No.: US 10,731,809 B1
(45) Date of Patent: Aug. 4, 2020

(54) SYNTHETIC GASLIGHT

(71) Applicants: Thomas Lawrence Mattausch, Seattle, WA (US); Daniel Werner Mattausch, Washington, DC (US)

(72) Inventors: Thomas Lawrence Mattausch, Seattle, WA (US); Daniel Werner Mattausch, Washington, DC (US)

( * ) Notice: Subject to any disclaimer, the term of this patent is extended or adjusted under 35 U.S.C. 154(b) by 0 days.

(21) Appl. No.: 16/554,577

(22) Filed: Aug. 28, 2019

(51) Int. Cl.
*F21S 10/04* (2006.01)
*F21V 8/00* (2006.01)
*H05B 45/10* (2020.01)
*F21Y 115/10* (2016.01)
*F21W 121/00* (2006.01)

(52) U.S. Cl.
CPC ............ *F21S 10/043* (2013.01); *G02B 6/001* (2013.01); *H05B 45/10* (2020.01); *F21W 2121/00* (2013.01); *F21Y 2115/10* (2016.08)

(58) Field of Classification Search
CPC ....... F21S 10/043; H05B 45/10; G02B 6/001; F21W 2121/00; F21Y 2115/10
See application file for complete search history.

(56) References Cited

U.S. PATENT DOCUMENTS

| | | | | |
|---|---|---|---|---|
| 3,890,085 A | * | 6/1975 | Andeweg | F21S 6/001 431/125 |
| 8,956,015 B2 | * | 2/2015 | Homma | F21V 7/0025 362/310 |
| 2011/0134628 A1 | * | 6/2011 | Pestl | F21V 33/004 362/96 |
| 2013/0033874 A1 | * | 2/2013 | Homma | F21V 7/0091 362/307 |
| 2019/0032876 A1 | * | 1/2019 | Jan | H02J 7/02 |

OTHER PUBLICATIONS www.ip.com search claim 1 of U.S. Appl. No. 16/554,577, no author (Year: 2020).*
www.ip.com search claim 7 of U.S. Appl. No. 16/554,577, no author (Year: 2020).*
www.ip.com search claim 13 of U.S. Appl. No. 16/554,577, no author (Year: 2020).*

* cited by examiner

*Primary Examiner* — Isiaka O Akanbi
*Assistant Examiner* — Glenn D Zimmerman

(57) ABSTRACT

A synthetic gaslight is described herein. The synthetic gaslight has a translucent upper section that simulates the upper part of a traditional gas flame, a translucent lower section that simulates the lower part of a traditional gas flame, and an opaque isolation section that prevents light from lower section from entering the upper section and that also prevents light from the upper section from entering the lower section. The translucent lower section maintains a constant illumination for the lower part of the simulated gas flame. The translucent upper section has a flickering illumination for the upper part of the simulated gas flame.

20 Claims, 16 Drawing Sheets

US 10,731,809 B1

SYNTHETIC GASLIGHT

BACKGROUND

A traditional gaslight was a light that burned aerated fuel to produce a flickering flame. Traditional gaslights were the ultimate development of flame-based lighting and were later replaced by the availability of electric lighting. One important aspect of a traditional gaslight was the flickering flame, which produced a varying flame that is familiar and comfortable to many observers and is in keeping with historical, archival, and museum environments. However, for many historical, archival, and museum environments, it is simply not safe or practical to use an open flame in lighting applications. In fact, most building codes would simply prohibit such an approach to historically accurate lighting due to fire concerns as well as the dangers of fuel combustion in modern air-tight buildings. Similarly, the associated soot and ash associated with such traditional gaslights prevent their use in many buildings. A synthetic gaslight uses modern technology to simulate both the appearance and the lighting effects of a traditional gaslight without the associated concerns or dangers.

BRIEF DESCRIPTION OF THE DRAWINGS

Various embodiments in accordance with the present disclosure will be described with reference to the drawings, in which.

DETAILED DESCRIPTION

Figure 1:
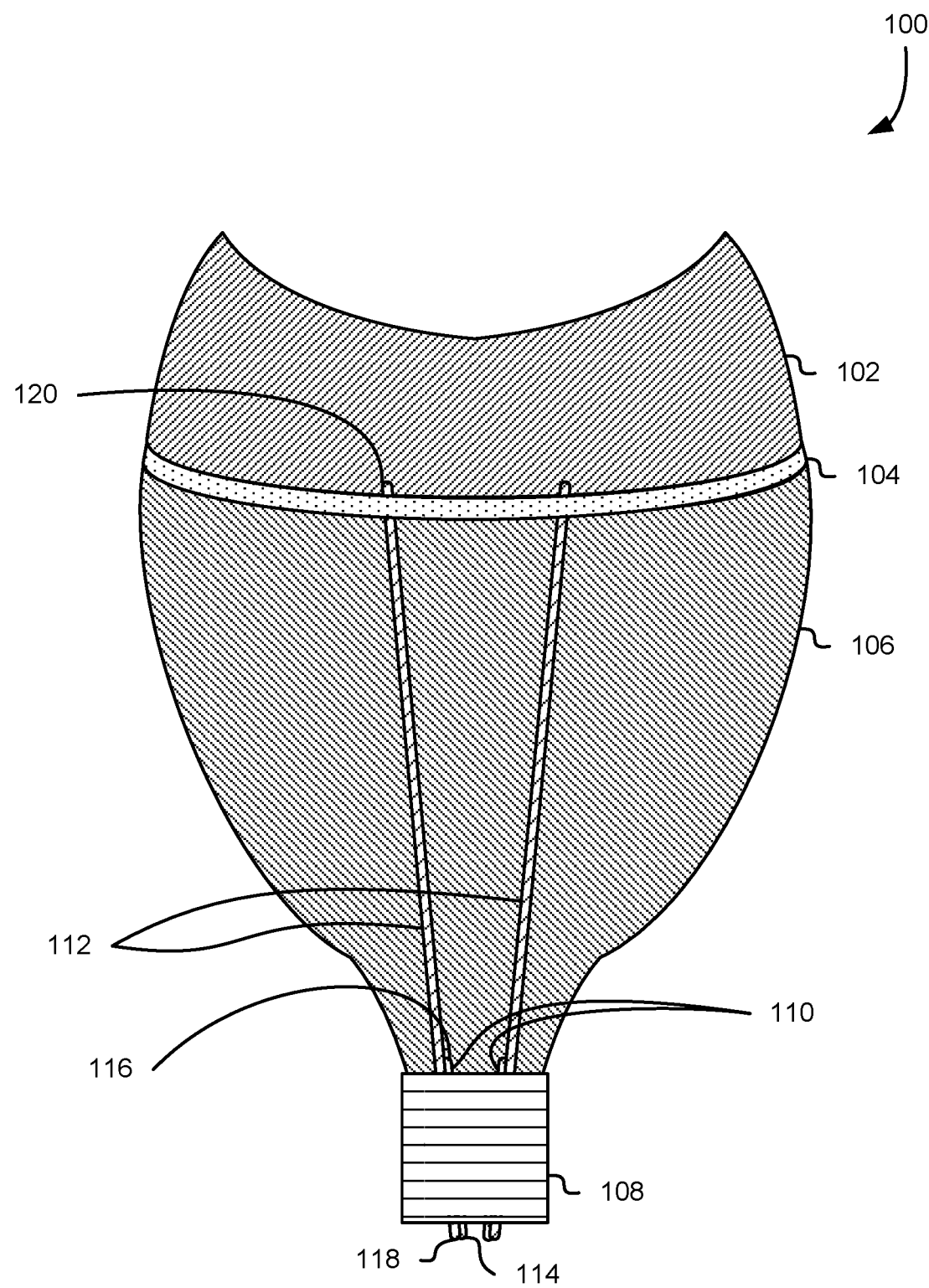
FIG. 1 illustrates an example synthetic gaslight in accordance with an embodiment.

A synthetic gaslight is device made to simulate the appearance of an open gas light flame as was traditionally seen in "Bats wing" (linear orifice) or "Fishtail" (impinging jets) gas-j et burners that were used to produce light in a variety of situations. The synthetic gaslight is a light fixture (i.e., is a lighting device that may be used as a light to produce illumination). A light fixture such as the synthetic gaslight described herein may be attached to a custom-built lighting system or may be attached to an existing lighting device or lighting system using, for example, one or more commonly used light fixture attachment methods. In an embodiment, the synthetic gaslight is operable as a replacement bulb for an existing lighting system (e.g., has a base that uses an "Edison" base code such as E10, E11, E26, has a base with a recessed contact such as an RSC/R7s, has a 2-pin contact such as a G4, G6.35, GX6.35, GY6.35, GU4, GZ4, GU5.3, Gy9.5, has 2 contacts such as a G9, has a twist lock such as a GU10, or has other such light bulb base types).

Various visual and experiential elements of traditional gas-jet burners were examined including, but not limited to, the visual elements of open flames and open gaslight flames and the behavior of such flames under various environmental conditions. The various visual and experiential elements of traditional gas-jet burners include, but are not limited to, the color and shape of the flame, the color and shape of regions of the flame (e.g., the flame pre-ignition portion, the flame ignition portion, the lower flame body portion, the upper flame body portion, the top of the flame, and other such regions of the flame), the flicker rate of the flame, the variance in flicker rate of the flame, and other such visual and experiential elements of traditional gas-jet burners.

From the various visual and experiential elements of traditional gas-jet burners that were used to produce light in a variety of situations (e.g., in museums, historical houses, and re-enactments of historical scenes), materials were chosen to convey the various visual and experiential elements of traditional gas-jet burners that were used to produce light and construction techniques were devised to convey the various visual and experiential elements of traditional gas-jet burners that were used to produce light so that a synthetic gaslight can be produced that maintains the various visual and experiential elements of traditional gas-jet burners that were used to produce light while providing a low-maintenance device with longevity, safety, and archival quality light.

One fundamental visual and experiential element of traditional gas-jet burners that were used to produce light is a constant flickering of the flame. For example, many traditional gas-jet burners that were used to produce light flicker at a rate of approximately fifteen cycles per second (i.e., 15 Hz.). In the example synthetic gaslight described herein, the body of the synthetic gaslight comprises two discrete sections that are optically isolated from each other so that light from the first section does not enter the other section. In an embodiment, the sections are carved from acrylic. In an embodiment, the sections are cast in acrylic. In an embodiment, the sections are carved or cast from other translucent colored materials including, but not limited to, glass, silicone, or various plastics (e.g., poly(methyl methacrylate) ("PMMA"), polyoxybenzylmethylenglycolanhydride ("Bakelite"), polyethylene ("PE"), polycarbonate ("PC"), polyoxymethylene ("POM"), polyvinyl chloride ("PVC"), etc.). In embodiment, the two sections are made from the same materials. In an embodiment, the two sections are made from different materials. In an embodiment, the body of the synthetic gaslight comprises a single section. In an embodiment, the body of the synthetic gaslight comprises three or more sections.

In the example synthetic gaslight described herein, the sections of the body of the gaslight are optically isolated from each other using a material that is opaque and reflective. In the example synthetic gaslight described herein, the sections of the body of the gaslight are optically isolated from each other using gold foil. In embodiment, the sections of the body of the gaslight are optically isolated from each other using reflective paint. In an embodiment, the sections of the body of the gaslight are optically isolated from each other using non-reflective paint. In an embodiment, the sections of the gaslight are optically isolated from each other using metallic foil such as tin foil, lead foil, silver foil, or some other such metallic foil.

As described above, in the example synthetic gaslight described herein, the body of the synthetic gaslight comprises two sections that are optically separated with gold foil that optically isolates the sections and provides internal reflection. The upper section of the synthetic gaslight (also referred to herein as the "Dance Zone") simulates the top of the flame of the synthetic gaslight. The upper section of the synthetic gaslight has a greater degree of flickering (i.e., a greater variance between the brightest and darkest light intensity. The lower section of the synthetic gaslight (also referred to herein as the "Ignition Zone") simulates the bottom of the flame of the synthetic gaslight. The lower section of the synthetic gaslight has a lesser degree of flickering in that it remains more solidly lit (e.g., flickers less) while the upper section is flickering more.

The example synthetic gaslight described herein may have one or more two flame points located at the upper portion of the upper section of the synthetic gaslight. The flame points are shaped sections of the upper portion of the upper section 202 that simulate the shape of the upper part of a gas flame. In an embodiment, the one or more flame points are differently sized and shaped to simulate a varying flame.

In the example synthetic gaslight described herein, one or more optical fibers are embedded within the upper section and within the lower section to provide light to respective sections. In an embodiment, the one or more optical fibers deliver light to the upper and lower sections at differing flickering rates so that the respective upper and lower sections flicker at differing rates as described herein. In an embodiment, two optical fibers are embedded in each of the upper and lower sections. In an embodiment, one optical fiber is embedded in each of the upper and lower sections. In an embodiment, differing numbers of optical fibers are embedded in each of the upper and lower sections. In an embodiment, the optical fibers are acrylic fiberoptic lines that provide transmission of light along the axis of the fiberoptic lines with limited transmission perpendicular to (e.g., outside of the axis) of the fiber.

In the example synthetic gaslight described herein, a light source is projected into a first end of an optical fiber of the one or more optical fibers and the light is projected along the axis of the optical fiber (i.e., according to the optical properties of optical fibers) so that the light is emitted at the second end of the optical fiber. In the example synthetic gaslight described herein, the first end of the optical fiber where the light source is projected in is referred to as the "source end" and the second end of the optical fiber where the light source is emitted is referred to as the "emission end." As described herein, when light is projected into the source end of the optical fiber the optical fiber, the optical fiber is said to be "illuminated" by the light source.

In the example synthetic gaslight described herein, the one or more optical fibers are illuminated with light of a specific frequency to simulate the appearance of gas flames. In an embodiment, the one or more optical fibers for the upper section (i.e., the "Dance" Zone) are illuminated with an orange colored light (e.g., light with a wavelength of approximately 640 to 590 nanometers ("nm")). In an embodiment, the one or more optical fibers for the lower section (i.e., the "Lower" Zone) are also illuminated with an orange colored light (e.g., light with a wavelength of approximately 640 to 590 nanometers ("nm")). In an embodiment, the one or more optical fibers for the upper section and the one or more optical fibers for the lower section are illuminated with the same colored light. In an embodiment, the one or more optical fibers for the upper section and the one or more optical fibers for the lower section are illuminated with different colored light (e.g., the upper section with one frequency of light and the lower section with a different frequency of light).

In an embodiment, the one or more optical fibers for the upper section and the one or more optical fibers for the lower section are illuminated with redder colored light (e.g., light with a longer wavelength approaching 700 nm). In an embodiment, the one or more optical fibers for the upper section and the one or more optical fibers for the lower section are illuminated with yellower colored light (e.g., light with a shorter wavelength approaching 560 nm). In an embodiment, the one or more optical fibers for the upper section and the one or more optical fibers for the lower section are illuminated with different visible colored light to simulate different flame types. In an embodiment, the one or more optical fibers for the upper section and the one or more optical fibers for the lower section are illuminated with one or more combinations of visible colored light to simulate varying flame types. In an embodiment, the one or more optical fibers for the upper section and the one or more optical fibers for the lower section are illuminated with wavelengths of light that are not within the visible light spectrum (e.g., greater than 700 nm or less than 400 nm) to simulate differing lighting effects.

In the example synthetic gaslight described herein, the upper section optical fibers are illuminated with a "flicker." As used herein, a flicker is the process whereby the intensity of the light projected into the source end of the one or more optical fibers of the upper section varies in intensity to simulate a varying flame. Illuminating the source end of an optical fiber with a flicker is also referred to herein as "flickering." As used herein, the "brightness" of a light is the amount of luminosity of a light at any particular time. For example, a light is said to have a "high" brightness, a "high" luminosity, or a "high" illumination when the light is emitting light that is greater than the average luminosity for the light. Similarly, a light is said to have a "low" brightness, a "low" luminosity, or a "low" illumination when the light is emitting light that is less than the average luminosity for the light. A light that is turned off has no brightness, luminosity, or illumination. A light that is fully turned on (i.e., is operating at full power), has its highest brightness, luminosity, or illumination.

The rate at which the light source at the source end of an optical fiber is varied from low illumination to high illumination (also referred to as "low brightness" and a "high brightness") is referred to herein as the "flicker rate." In the example synthetic gaslight described herein, the flicker rate of the upper section optical fibers varies from low illumination (e.g., the least amount of light) to high illumination (e.g., the greatest amount of light) at approximately fifteen cycles per second (i.e., 15 Hz). In an embodiment, the flicker rate is exactly 15 Hz. In an embodiment, the flicker rate varies in that the flicker rate changes (e.g., varies between, for example 13 Hz and 17 Hz) under the control of a flicker controller, described herein. In an embodiment, the low illumination (i.e., the least amount of light projected into the source end of the one or more optical fibers) is no light (e.g., the light is extinguished). In an embodiment, the low illumination (i.e., the least amount of light projected into the source end of the one or more optical fibers) is some light (e.g., the light is not extinguished).

In the example synthetic gaslight described herein, the lower section optical fibers are illuminated with less "flicker" in that the difference between the low illumination and the high illumination is low (i.e., the light intensity does not vary greatly). In an embodiment, the flicker rate of the lower section optical fibers is considerably slower than 15 Hz (e.g., as low as 0.1 Hz).

In an embodiment, and as described below, the one or more optical fibers are illuminated using one or more fiberoptic projectors that produce the varying light of the flickering (e.g., the color and intensity changes of the light) using a combination of differently colored lighting gels on rotating wheels (also referred to herein as a rotating mechanism), which are an integrated component of the projectors. In such an embodiment, the upper section projectors (i.e., the light projectors that project light into the upper section of the synthetic gaslight) include a rotating mechanism such as, for example, one or more rotating perforated wheels (e.g., a rotating mechanism with one or more perforations operable to change the amount of light that projected past the wheel) which occlude the light source from the one or more source fiber ends to produce the flickering. In such an embodiment, the one or more fiberoptic projectors are controlled with a computer system that is programmed using a Digital Multiplex ("DMX") lighting control protocol such as, for example, digital multiplex ("DMX" or "DMX512"), digital addressable lighting interface ("DALI"), digital serial interface ("DSI"), or some other such lighting control protocol. In such an embodiment, the color and intensity of the light that is used to illuminate the one or more fiberoptic cables is altered by changing the speed or position or the position of the rotating wheels (i.e., the color wheel and the perforation wheels).

In an embodiment, and as described below, the one or more optical fibers are illuminated using a light emitting diode ("LED") or a light emitting diode array ("LED array") of one or more light emitting diodes ("LEDs") of varying colors that controlled with a computer system that is programmed using a lighting control system such as those described above.

In the example synthetic gaslight described herein, the upper section (or "Dance Zone") is optically separated from the lower section (or "Ignition Zone") using gold foil. In the example synthetic gaslight described herein, the upper section is attached to one side of the gold foil at the lower portion of the upper section and the lower section is attached to the opposite side of the gold foil at the upper portion of the lower section. In the example synthetic gaslight described herein, the lower portion of the upper section has a shape that conforms to the shape of the upper portion of the lower section so that the upper section and lower section fit together closely, with the gold foil between them.

In the example synthetic gaslight described herein, the one or more optical fibers for the lower section enter the lower section at the lower portion of the lower section and are embedded within the lower section such that the emission end(s) of the one or more optical fibers for the lower section do not extend into the upper section (e.g., do not pass through the gold foil).

In the example synthetic gaslight described herein, the one or more optical fibers for the upper section enter the lower section at the lower portion of the lower section and are embedded within the lower section, pass through the upper portion of the lower section, pass through the gold foil, enter the lower portion of the upper section, and are embedded in the upper section such that the emission end(s) of the one or more optical fibers for the upper section extend into the upper section (e.g., pass through the gold foil).

In the example synthetic gaslight described herein, the lower section is attached to the gold foil at the upper portion of the lower section using ultraviolet adhesive glue, which is an ultraviolet ("UV") light cured adhesive with a high degree of optical clarity (e.g., it does not impact the color or intensity of light projected through the adhesive). In the example synthetic gaslight described herein, the upper section is also attached to the opposite side of the gold foil at the lower portion of the upper section using ultraviolet adhesive glue. In the example synthetic gaslight described herein, the one or more optical fibers are embedded within the upper and/or lower sections and attached to those sections using ultraviolet adhesive glue. In an embodiment, the various parts of the synthetic gaslight are attached together using a liquid optically clear adhesive ("LOCA") such as single cure acrylic with UV cure (such as the ultraviolet adhesive glue described above), single cure silicone with UV cure, single cure silicone with thermal or infrared cure (i.e., "snap cure" adhesives), dual cure acrylic (i.e., with UV and heat), dual cure silicone (i.e., with UV and moisture), or some other such LOCA.

In the example synthetic gaslight described herein, a stub (also referred to herein as a "mounting stub") is attached to the lower portion of the lower section to provide a mounting point for the synthetic gaslight. In an embodiment, the stub is constructed with copper to imitate (or simulate) the appearance of a gas pipe and a gas burner that was traditionally found at the base of a gaslight.

In the example synthetic gaslight described herein, the light from the emission end of the optical fiber is diffused throughout the upper and lower sections using a polyurethane coating with glass microspheres in suspension. This coating diffuses the light from the emission end of the optical fiber with little loss in the intensity of the emitted light. In an embodiment, the surface of the upper section and/or the lower section of the synthetic gaslight are coated with one or more light diffusion additives to increase an amount of diffusion of the light from the synthetic gaslight (also referred to herein as the amount of "diffused light" from the synthetic gaslight). In an embodiment, the upper section and/or the lower section of the synthetic gaslight are coated with a coating that includes a polyurethane base, an acrylic-specific adhesion promotor (i.e., that promotes the adhesion of the polyurethane base to the acrylic of the synthetic gaslight), and one or more light diffusion additives. In an embodiment, the one or more light diffusion additives include, but are not limited to, glass microspheres. In an embodiment, the surface of the upper section and/or the lower section of the synthetic gaslight are abraded (i.e., roughened) to increase an amount of diffusion of the light from the synthetic gaslight (also referred to herein as the amount of "diffused light" from the synthetic gaslight). In an embodiment, a combination of coating and abrading the surface of the upper section and/or the lower section of the synthetic gaslight is used to increase an amount of diffusion of the light from the synthetic gaslight. In an embodiment where the light from the synthetic gaslight is colored (e.g., orange), the light from the synthetic gaslight is referred to herein as "diffused colored light," so as to indicate that the light is both colored and diffused using one or more of the light diffusion techniques described herein.

In the example synthetic gaslight described herein, the lower section includes an ignition gradient transition where the visible portion of the flame varies from transparent at the lower portion of the lower section (e.g., where the flame begins) and clear to translucent and flame colored (i.e., orange, as described above). In an embodiment, a translucent colored material such as, for example, acrylic plastic, is used to simulate the ignition gradient of the simulated gaslight flame of the lower portion. This ignition gradient transition is a result of the visible appearance of a traditional gaslight where the emitted gas (e.g., natural gas) of the flame does not ignite until it has mixed with enough oxygen to burn. Because a gas used in a traditional gaslight may burn at, for example, between a 4% and 15% concentration of fuel in air, a gradient is used to simulate the upper limit of flammable concentration (i.e., a the lower portion of the ignition gradient section) and the lower limit of flammable concentration (i.e., near the upper portion of the ignition gradient section).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example synthetic gaslight 100 in accordance with an embodiment. The example synthetic gaslight 100 illustrated in FIG. 1 has an upper section 102 (indicated in FIG. 1 and throughout herein with narrow diagonal lines that rise from left to right), an opaque isolation section 104 (indicated in FIG. 1 and throughout herein with small dots), a lower section 106 (indicated in FIG. 1 and throughout herein with narrow diagonal lines that rise from right to left), and a mounting stub 108 (indicated in FIG. 1 and throughout herein with broad horizontal lines).

One or more optical fibers enter the example synthetic gaslight 100 at the lowest part of the mounting stub 108, pass through the mounting stub 108, and into the lower section 106 of the example synthetic gaslight 100. In the example synthetic gaslight 100 illustrated in FIG. 1, there are two lower section optical fibers 110 and two upper section optical fibers 112. The lower section optical fibers 110 are indicated in FIG. 1 and throughout herein with broad diagonal lines that rise from right to left. The upper section optical fibers 112 are indicated in FIG. 1 and throughout herein with broad diagonal lines that rise from left to right. Each of the lower section optical fibers 110 terminates within the lower section 106 of the example synthetic gaslight 100. Each of the upper section optical fibers 112 passes through the lower section 106 of the example synthetic gaslight 100, through the isolation section 104 of the example synthetic gaslight 100 and terminates within the upper section 102 of the example synthetic gaslight 100.

Light is projected into the source end of the one or more optical fibers using the light transmission methods described herein and that light is emitted from the emission end of the one or more optical fibers as described above. In the example synthetic gaslight 100 illustrated in FIG. 1, light enters the source end 114 of one of the two lower section optical fibers 110 and is emitted from the emission end 116 of one of the two lower section optical fibers 110. The emission end 116 of the lower section optical fiber (i.e., each of the lower section optical fibers 110) terminates within the lower section 106 of the example synthetic gaslight 100 so that the light that is projected into the two lower section optical fibers 110 is projected into the lower section 106 of the example synthetic gaslight 100. It should be noted that the source end of the other of the two lower section optical fibers 110 and the emission end of the other of the two lower section optical fibers 110 have been omitted in FIG. 1 for clarity.

As used herein, an optical fiber is a light transmission medium with directional characteristics. Light in an optical fiber is transmitted as a narrow, directional projection from the source end of the optical fiber to the emission end of the optical fiber. In order to simulate an evenly incandescent flame while limiting high and low concentrations of light, the orientation and location of the source and emission ends of the optical fibers within the synthetic gaslight are as described herein. Additionally, the light that is emitted into the upper and lower sections is diffused as described herein. In an embodiment, the light is diffused using coatings such as acrylic-specific adhesion promoters to diffuse the light. In an embodiment, the light is diffused using glass microspheres in suspension to diffuse the light.

In the example synthetic gaslight 100 illustrated in FIG. 1, light enters the source end 118 of one of the two upper section optical fibers 112 and is emitted from the emission end 120 of one of the two upper section optical fibers 112. The emission end 120 of the upper section optical fiber (i.e., each of the upper section optical fibers 112) passes through the lower section 106, through the isolation section 104, and terminates within the upper section 102 of the example synthetic gaslight 100 so that the light that is projected into the two upper section optical fibers 112 is projected into the upper section 102 of the example synthetic gaslight 100. It should be noted that the source end of the other of the two upper section optical fibers 112 and the emission end of the other of the two upper section optical fibers 112 have been omitted in FIG. 1 for clarity.

In the example synthetic gaslight 100 illustrated in FIG. 1, light that is projected into the source end 114 of the lower section optical fibers 110 and that is emitted into the lower section 106 from the emission end 116 of the lower section optical fibers 110 is not projected into the upper section 102 because the opaque isolation section 104 is opaque and reflective (e.g., is made from an opaque material that does not allow light to transmit through the opaque isolation section 104 and is reflected by the opaque isolation section 104), as described herein. Similarly, light that is projected into the source end 118 of the upper section optical fibers 112 and that is emitted into the upper section 102 from the emission end 120 of the upper section optical fibers 112 is not projected into the lower section 106 because the opaque isolation section 104 is made from an opaque material that is opaque and reflective, as described herein.

In the example synthetic gaslight 100 illustrated herein, the upper section 102 of the synthetic gaslight simulates the top portion of the simulated gaslight flame and the lower section 106 simulates the bottom portion of the simulated gaslight flame. As used herein, the top portion of the simulated gaslight flame is the portion of the gaslight flame that flickers to simulate the "Dance Zone" of the simulated gaslight flame. As used herein, the bottom portion of the simulated gaslight flame is the portion of the gaslight flame that maintains a constant (but varying in some embodiments) illumination to simulate the "Ignition Zone" of the simulated gaslight flame. In an embodiment, the bottom portion of the simulated gaslight flame has a pre-ignition portion, a flame ignition portion, and lower flame body portion, as described herein.

Figure 2:
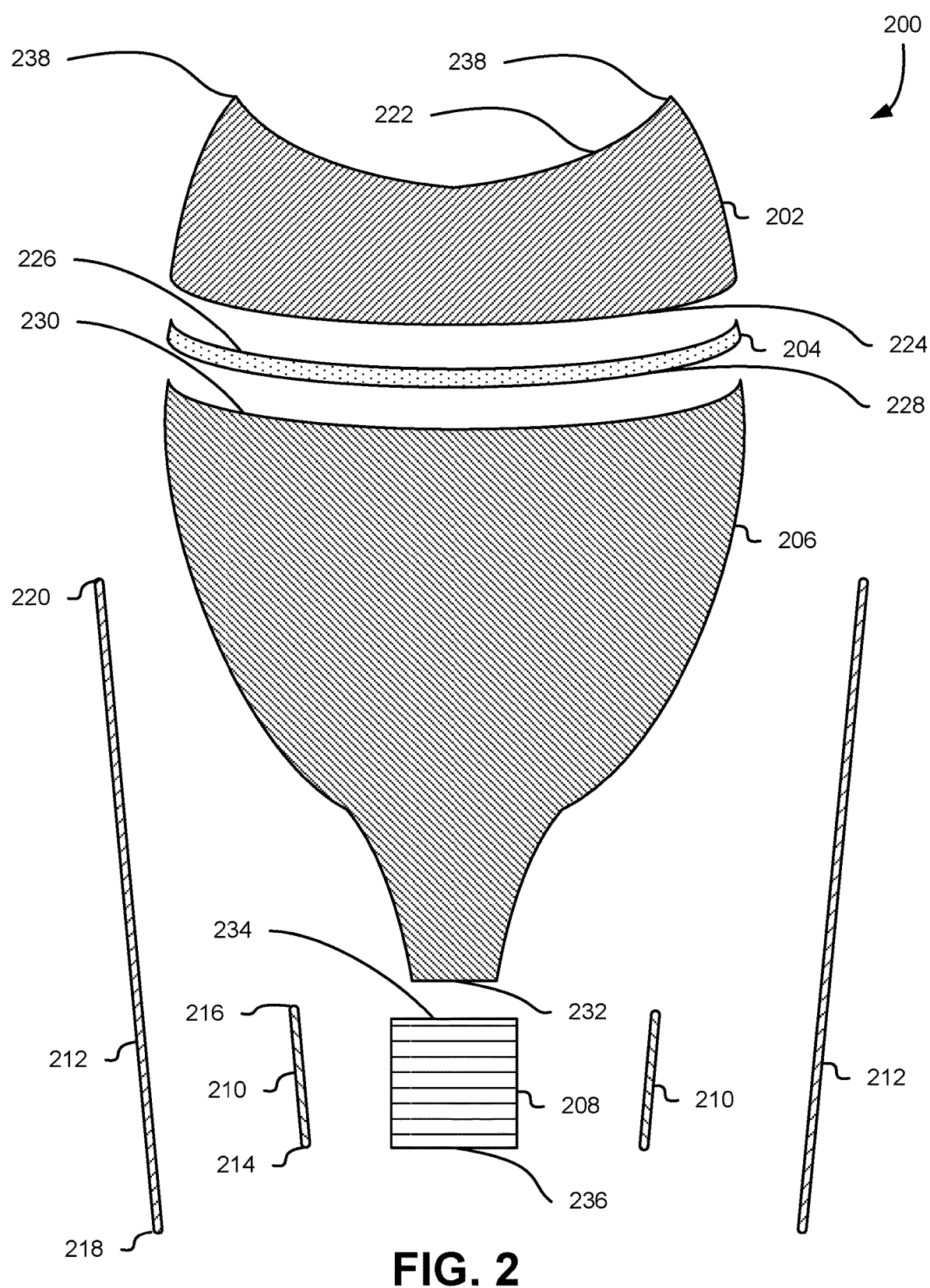
FIG. 2 illustrates an exploded view of an example synthetic gaslight in accordance with an embodiment.

FIG. 2 illustrates an exploded view 200 of an example synthetic gaslight such as the example synthetic gaslight 100 described in connection with FIG. 1 and in accordance with an embodiment. The exploded view 200 of the example synthetic gaslight shows an upper section 202 (which corresponds to the upper section 102 described in connection with FIG. 1) indicated by narrow diagonal lines that rise from left to right, an opaque isolation section 204 (which corresponds to the opaque isolation section 104 described in connection with FIG. 1) indicated by small dots, a lower section 206 (which corresponds to the lower section 106 described in connection with FIG. 1) indicated by narrow diagonal lines that rise from right to left, and a mounting stub 208 (which corresponds to the mounting stub 108 described in connection with FIG. 1) indicated by broad horizontal lines.

The exploded view 200 of the example synthetic gaslight shows two lower section optical fibers 210 (which correspond to the two lower section optical fibers 110 described in connection with FIG. 1) indicated by broad diagonal lines that rise from right to left, each with source end 214 and an emission end 216 as described herein. As with FIG. 1, the source end and emission end of the other of the two lower section optical fibers 110 is not indicated here in order to not clutter the figure. The exploded view 200 of the example synthetic gaslight shows two upper section optical fibers 212 (which correspond to the two upper section optical fibers 112 described in connection with FIG. 1) indicated by broad diagonal lines that rise from left to right, each with source end 218 and an emission end 220 as described herein. As with FIG. 1, the source end and emission end of the other of the two upper section optical fibers 112 are not indicated here in the interest of clarity.

The upper section 202 of the example synthetic gaslight illustrated in FIG. 2 has an upper portion 222 (also referred to herein as the "upper portion of the upper section") and a lower portion 224 (also referred to herein as the "lower portion of the upper section").

The opaque isolation section 204 of the example synthetic gaslight illustrated in FIG. 2 also has an upper portion 226 (also referred to herein as the "upper portion of an opaque isolation section" and a "top side of an opaque isolation section") and a lower portion 228 (also referred to herein as the "lower portion of the opaque isolation section" and a "bottom side of an opaque isolation section.").

The lower section 206 of the example synthetic gaslight illustrated in FIG. 2 also has an upper portion 230 (also referred to herein as the "upper portion of the lower section") and a lower portion 232 (also referred to herein as the "lower portion of the lower section").

The lower portion 224 of the upper section 202 of the example synthetic gaslight is shaped so that it fits closely with the upper portion 226 of the opaque isolation section 204 (or "top side of the opaque isolation section"). In an embodiment where the opaque isolation section 204 is made of gold foil, the lower portion 224 of the upper section 202 of the example synthetic skylight is shaped so that it fits closely with the upper portion 230 of the lower section 206.

As described above, the lower portion 224 of the upper section 202 of the example synthetic skylight is attached to the upper portion 226 of the opaque isolation section 204 (or "top side of the opaque isolation section") using, for example, ultraviolet adhesive glue (e.g., glue that is accelerated and cured using ultraviolet light, as described above). Similarly, the lower portion 228 of the opaque isolation section 204 (or "bottom side of the opaque isolation section") is attached to the upper portion 230 of the lower section 206 using, for example, ultraviolet adhesive glue.

In an embodiment, the mounting stub 208 is attached to the lower section 206 of the example synthetic gaslight so that upper portion 234 of the mounting stub 208 is above the lower portion 232 of the lower section 206 and the lower portion 236 of the mounting stub 208 is below the lower portion 232 of the lower section 206. In an embodiment, the upper portion 234 of the mounting stub 208 is attached to the lower portion 232 of the lower section 206. In such an embodiment, the upper portion 234 of the mounting stub 208 is shaped so that it fits closely with the lower portion 232 of the lower section 206. In an embodiment, the mounting stub 208 is attached to the lower section 206 using an adhesive such as ultraviolet adhesive glue.

The exploded view 200 of the example synthetic gaslight illustrated in FIG. 2 shows two flame points 238, which are located at the upper portion 222 of the upper section 202. The two flame points 238 are shaped sections of the upper portion 222 of the upper section 202 that simulate the shape of the upper part of a gas flame. As may be contemplated, although the example synthetic gaslights described herein show two equally sized flame points such as the two flame points 238 at the upper portion 222 of the upper section 202, other numbers, sizes, and locations of the flame points may be considered as within the scope of this disclosure. For example, in an embodiment, there is a single flame point located at the upper portion 222 of the upper section 202. In an embodiment, there are three or more flame points located at the upper portion 222 of the upper section 202. In an embodiment, the one or more flame points such as the two flame points 238 are of different sizes. In an embodiment, the one or more flame points such as the two flame points 238 are located at other points on the upper section 202. In an embodiment, one or more flame points are located at the upper portion 230 of the lower section 206. In such an embodiment, the opaque isolation section 204 and/or the upper section 202 are reshaped accordingly.

Figure 3:
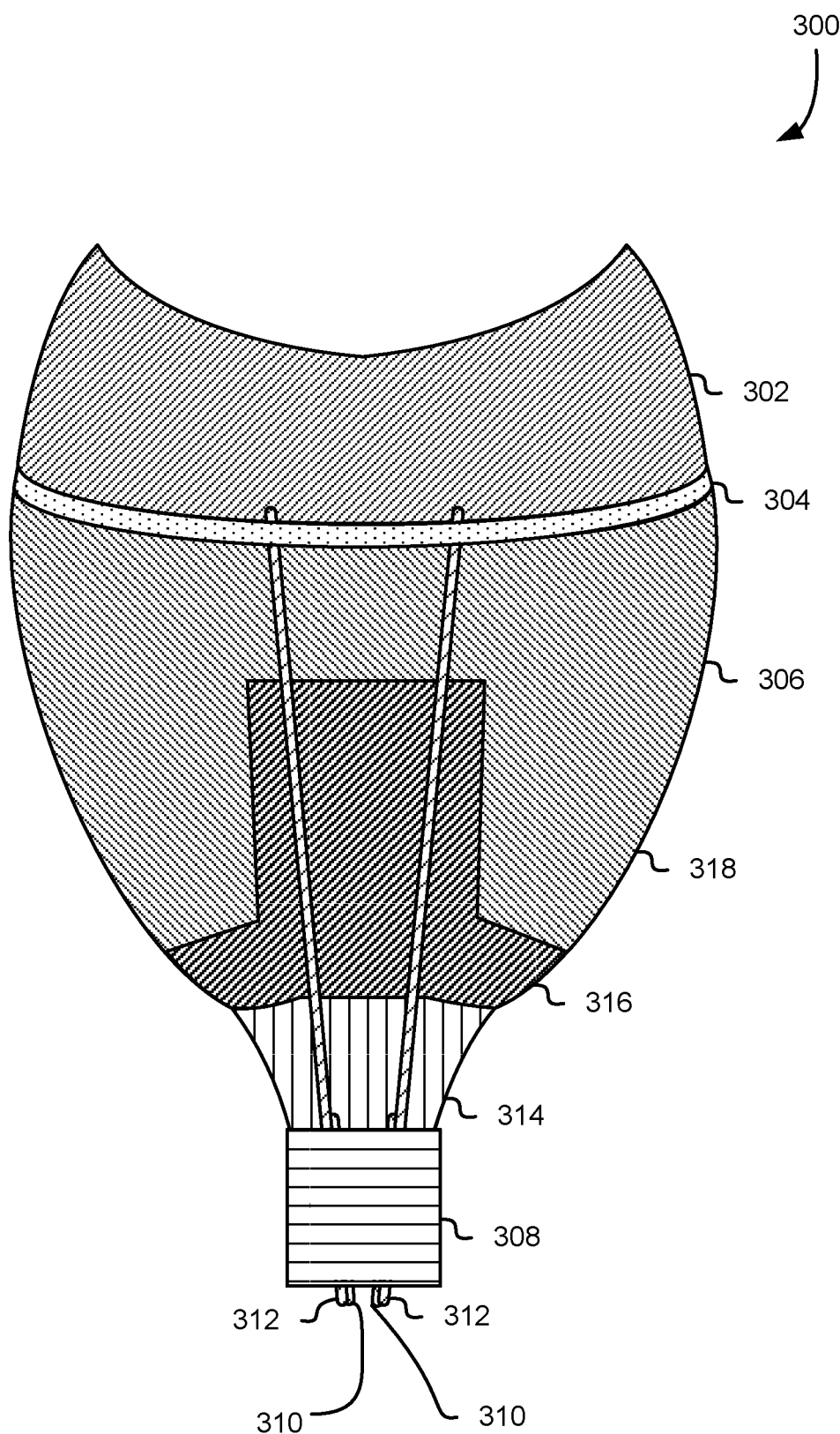
FIG. 3 illustrates an example synthetic gaslight with gradient sections in accordance with an embodiment.

FIG. 3 illustrates an example synthetic gaslight with gradient sections 300 in accordance with an embodiment. As may be contemplated, aspects of the example synthetic gaslight 100 described at least in connection with FIG. 1 may also apply to the example synthetic gaslight with gradient sections 300 described in connection with FIG. 3.

The example synthetic gaslight with gradient sections 300 illustrated in FIG. 3 shows an upper section 302 (which corresponds to the upper section 102 described in connection with FIG. 1) indicated by narrow diagonal lines that rise from left to right, an opaque isolation section 304 (which corresponds to the opaque isolation section 104 described in connection with FIG. 1) indicated by small dots, a lower section 306 (which corresponds to the lower section 106 described in connection with FIG. 1) the different gradient sections of which are indicated as described below, and a mounting stub 308 (which corresponds to the mounting stub 108 described in connection with FIG. 1) indicated by broad horizontal lines.

The example synthetic gaslight with gradient sections 300 illustrated in FIG. 3 shows two lower section optical fibers 310 (which correspond to the two lower section optical fibers 110 described in connection with FIG. 1) indicated by broad diagonal lines that rise from right to left, each with source end and an emission end as described above and two upper section optical fibers 312 (which correspond to the two upper section optical fibers 112 described in connection with FIG. 1) indicated by broad diagonal lines that rise from left to right, each with source end and an emission end as described above.

The example synthetic gaslight with gradient sections 300 illustrated in FIG. 3 shows three gradient sections of the lower section 306. The three gradient sections of the lower section 306 are the ignition section 314 (indicated in FIG. 3 and throughout herein with broad vertical lines), the ignition transition section 316 (indicated in FIG. 3 and throughout herein with dark narrow diagonal lines that rise from left to right) and the lower flame body section 318 (indicated in FIG. 3 and throughout herein with the narrow diagonal lines that rise from right to left). The lower flame body section 318 is indicated by the same narrow diagonal lines that rise from right to left as the lower section 106 described in connection with FIG. 1.

A flame simulated by a synthetic gaslight is referred to herein as "a simulated gaslight flame." As described herein, a simulated gaslight flame is a simulated by the synthetic gaslight to imitate the appearance of a tradition gaslight flame. As described herein, a simulated gaslight flame has a top portion (also referred to herein as the open flame portion), which is orange colored and flickering and a bottom portion (also referred to herein as the ignition section), which varies in color and is constant. In an embodiment and as described herein, the bottom portion of the simulated gaslight flame has a flame pre-ignition portion, a flame ignition transition portion, and a lower flame body portion as described below.

As described above, the ignition section 314 of the lower section 306 is transparent and clear so that it does not internally reflect or refract visible light. The ignition section 314 of the lower section 306 is also colorless in that it does not alter the color of light that is transmitted through it. This transparent, colorless, and clear material allows a synthetic gaslight to simulate the appearance of the flame pre-ignition portion of the bottom portion of the simulated gaslight (i.e., the simulated flame of a traditional gaslight) where the emitted gas of the flame does not ignite until it has mixed with enough oxygen to burn as described herein.

Also as described above, the ignition transition section 316 of the lower section 306 varies from transparent and clear at the lower portion of the ignition transition section 316 (i.e., the part of the ignition transition section that is adjacent to the ignition section) to translucent and flame colored (i.e., orange, as described above) at the upper portion of the ignition transition section 316. The ignition transition section 316 of the lower section 306 simulates the flame ignition transition portion of the bottom portion of the simulated gaslight flame (i.e., the simulated flame of a traditional gaslight). The material of the synthetic gaslight that is used to simulate the portions of the simulated gaslight flame (e.g., the top portion, the bottom portion, the pre-ignition portion, the ignition transition portion, the lower flame body portion, etc.) is either a translucent colored material (e.g., colored acrylic plastic that transmits and alters the color of some light and refracts some of that light), a translucent colorless material (e.g., colorless acrylic plastic that transmits light unaltered and refracts some of that light), a transparent colorless material (e.g., colorless acrylic plastic that transmits light unaltered and refracts none of that light), or a transparent colored material (e.g., colored acrylic plastic that transmits and alters the color of the light and refracts none or that light).

In the example synthetic gaslight described herein, the ignition transition section 316 is made from a material (e.g., an acrylic plastic) that displays a first type of light (e.g., no light) at the lower part of the ignition transition section 316 (also referred to herein as an ignition gradient section), displays a second type of light (e.g., orange light) at the upper part of the ignition transition section 316, and displays light that varies between the first type of light and the second type of light in between the lower part of the ignition transition section 316 and the upper part of the ignition transition section 316. In an embodiment, the light that varies between the first type of light and the second type of light in between the lower part of the ignition transition section 316 and the upper part of the ignition transition section 316 varies uniformly between the two types of light using a simple gradient (i.e., varies uniformly between the first type of light and the second type of light).

Light that varies between the first type of light and the second type of light in between the lower part of the ignition transition section 316 and the upper part of the ignition transition section 316 varies uniformly between the two types of light using a simple gradient does so because a gas used in a traditional gaslight may burn at, for example, between a 4% and 15% concentration of fuel in air. Accordingly, a gradient is used to simulate the upper limit of flammable concentration (i.e., at the lower portion of the ignition transition section 316) and the lower limit of flammable concentration (i.e., near the upper portion of the ignition transition section 316). The gradient of the ignition transition section 316 causes the simulated flame to begin to appear at the lower portion of the ignition transition section 316 rather than at the emission end of the two lower section optical fibers 310 (i.e., in the ignition section 314 of the lower section 306). The ignition transition section 316 also causes the simulated flame to transition to the full simulated flame at the upper portion of the ignition transition section 316. The remainder of the lower section 306 (i.e., the lower flame body section 318) simulates the lower flame body portion of the simulated gaslight flame (i.e., the simulated flame of a traditional gaslight), as described herein.

In an embodiment, the gradient of the ignition transition section 316 is simulated by varying the surface and internal characteristics of the sections of the lower section 306. For example, smooth acrylic emits very little light even when transmitting light through the acrylic, whereas acrylic with a very rough surface catches and emits any light that encounters the surface. In an embodiment, this gradient of the ignition transition section 316 is simulated by using materials with varying optical properties for different parts of the lower section such as those described above including, but not limited to, surface polymers, glass microspheres, surface abrasion, and other such optical property varying materials.

In an embodiment, the ignition transition section 316 includes color variations of the material to simulate the transition from initial ignition (i.e., at the lower portion of the ignition transition section 316) to full flame (i.e., at the upper portion of the ignition transition section). In an embodiment, additional optical fibers are introduced into the lower section to provide these color variations.

Figure 4:
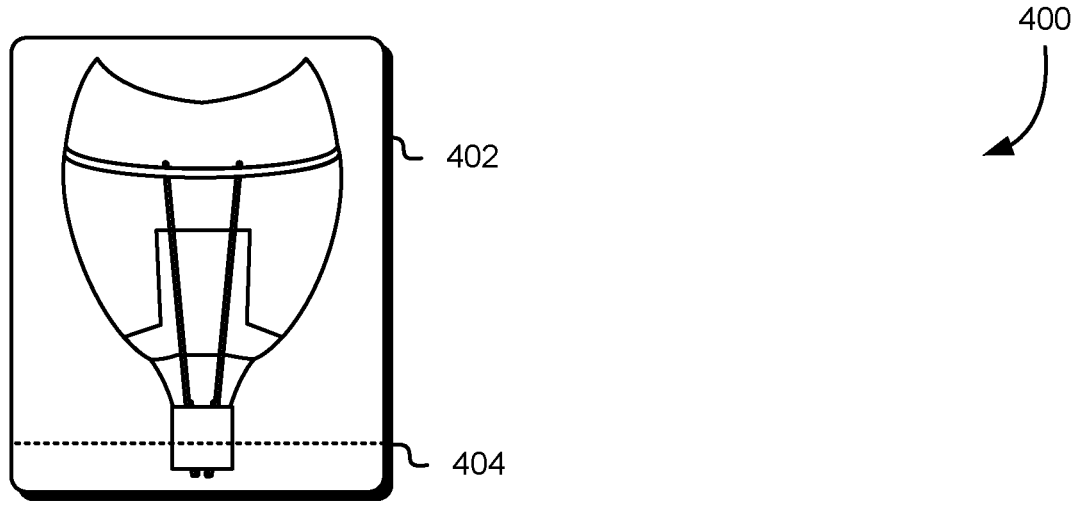
FIG. 4 illustrates a cross-sectional view of an example synthetic gaslight with gradient sections in accordance with an embodiment.
Figure 4:
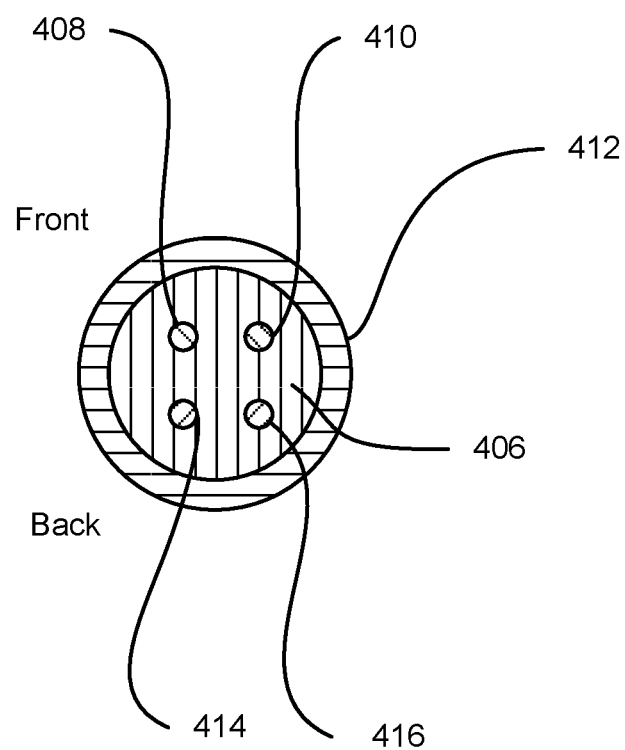

FIG. 4 illustrates a cross-sectional view 400 of a synthetic gaslight with gradient sections 402 such as the example synthetic gaslight with gradient sections 300 described in connection with FIG. 3 and in accordance with an embodiment. As may be contemplated, aspects of the cross-sectional view 400 of the synthetic gaslight with gradient sections described in connection with FIG. 4 may also apply to the example synthetic gaslight 100 described in connection with FIG. 1.

The cross-sectional view 400 of the synthetic gaslight with gradient sections 402 illustrated in FIG. 4 shows the cross-section of the synthetic gaslight at a location indicated by the dotted line 404 (i.e., at a location that intersects the mounting stub of the synthetic gaslight).

The cross-sectional view 400 of the synthetic gaslight with gradient sections 402 shows a first upper section optical fiber 408, a second upper section optical fiber 410 (indicated by broad diagonal lines rising from right to left), a first lower section optical fiber 414 and a second lower section optical fiber 416 (indicated by broad diagonal lines rising from left to right), and the mounting stub 412 (indicated by broad horizontal lines) that surrounds the lower section 406 (indicated by broad horizontal lines that represent an ignition section such as the ignition section 314 described above in connection with FIG. 3).

Figure 5:
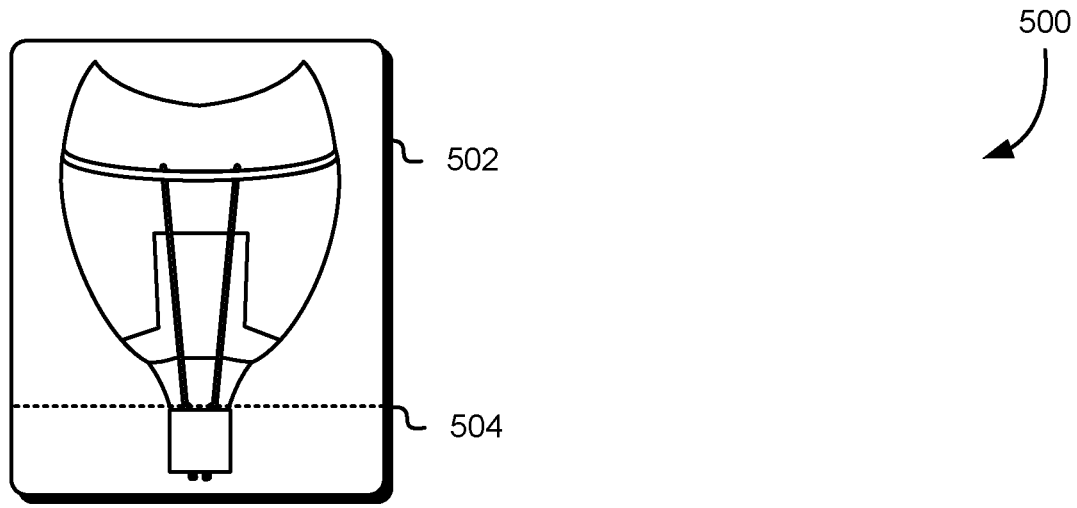
FIG. 5 illustrates a cross-sectional view of an example synthetic gaslight with gradient sections in accordance with an embodiment.
Figure 5:
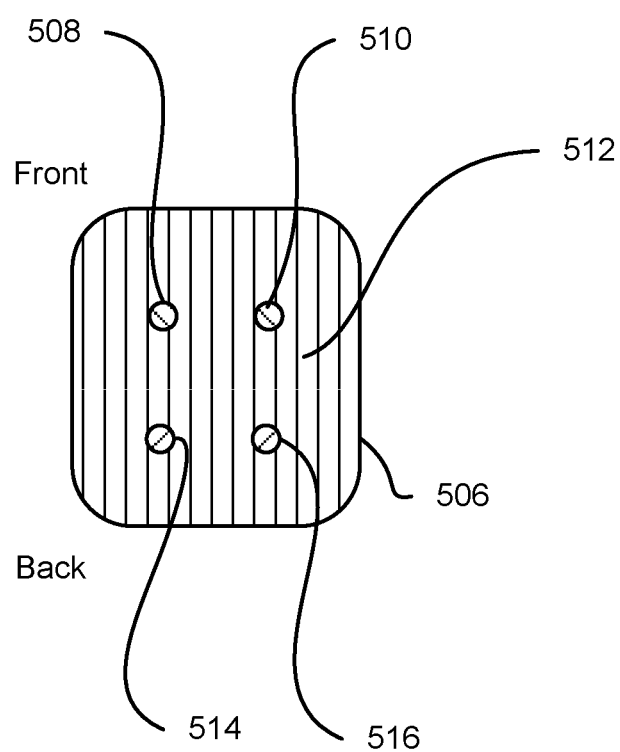

FIG. 5 illustrates a cross-sectional view 500 of a synthetic gaslight with gradient sections 502 such as the example synthetic gaslight with gradient sections 300 described in connection with FIG. 3 and in accordance with an embodiment. As may be contemplated, aspects of the cross-sectional view 500 of the synthetic gaslight with gradient sections described in connection with FIG. 5 may also apply to the example synthetic gaslight 100 described in connection with FIG. 1.

The cross-sectional view 500 of the synthetic gaslight with gradient sections 502 illustrated in FIG. 5 shows the cross-section of the synthetic gaslight at a location indicated by the dotted line 504 (i.e., at a location that is above the mounting stub and below the emission end of the lower section optical fibers).

The cross-sectional view 500 of the synthetic gaslight with gradient sections 502 shows a first upper section optical fiber 508, a second upper section optical fiber 510 (indicated by broad diagonal lines rising from right to left), a first lower section optical fiber 514 and a second lower section optical fiber 516 (indicated by broad diagonal lines rising from left to right), and a lower section 506. In the cross-sectional view 500 of the synthetic gaslight with gradient sections 502 illustrated in FIG. 5 the portion of the lower section 506 illustrated is an ignition section 512 as described above (indicated by broad horizontal lines). It should be noted that the first lower section optical fiber 514 and the second lower section optical fiber 516 terminate above the location indicated by the dotted line 504 (i.e., the emission end of the first lower section optical fiber 514 and the emission end of the second lower section optical fiber 516 are above the location indicated by the dotted line 504.

Figure 6:
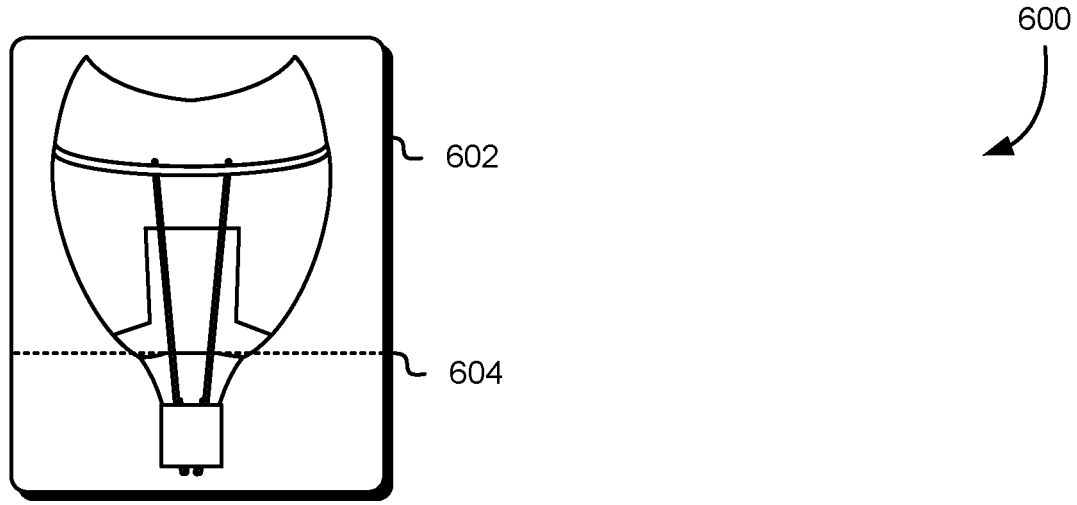
FIG. 6 illustrates a cross-sectional view of an example synthetic gaslight with gradient sections in accordance with an embodiment.
Figure 6:
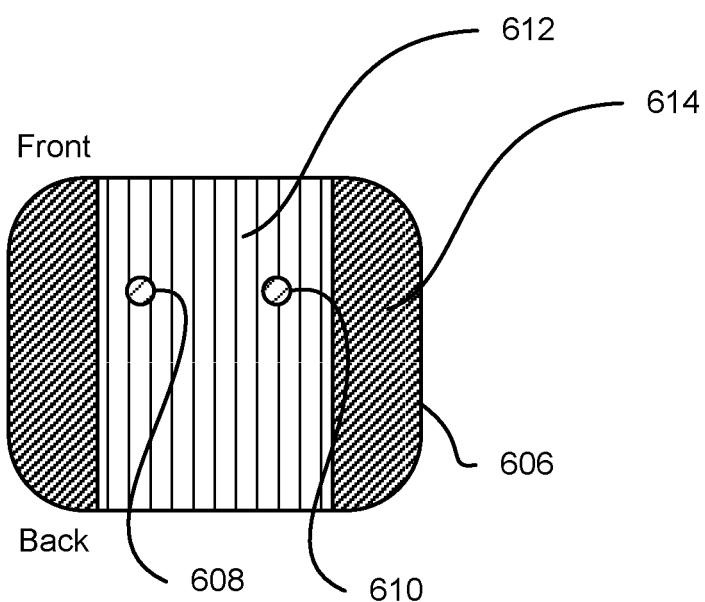

FIG. 6 illustrates a cross-sectional view 600 of a synthetic gaslight with gradient sections 602 such as the example synthetic gaslight with gradient sections 300 described in connection with FIG. 3 and in accordance with an embodiment. As may be contemplated, aspects of the cross-sectional view 600 of the synthetic gaslight with gradient sections described in connection with FIG. 6 may also apply to the example synthetic gaslight 100 described in connection with FIG. 1.

The cross-sectional view 600 of the synthetic gaslight with gradient sections 602 illustrated in FIG. 6 shows the cross-section of the synthetic gaslight at a location indicated by the dotted line 604 (i.e., at a location that is above the emission end of the lower section optical fibers and that intersects the ignition section and the ignition transition section of the lower section of the synthetic gaslight with gradient sections 602).

The cross-sectional view 600 of the synthetic gaslight with gradient sections 602 shows a first upper section optical fiber 608, a second upper section optical fiber 610 (indicated by broad diagonal lines rising from right to left) and a lower section 606. In the cross-sectional view 600 of the synthetic gaslight with gradient sections 602 illustrated in FIG. 6 the portion of the lower section 606 illustrated has an ignition section 612 (indicated by broad horizontal lines) and an ignition transition section 614 (indicated by dark diagonal lines rising from left to right). As described herein, the first upper section optical fiber 608 and the second upper section optical fiber 610 continue through the lower section and the opaque isolation section of the synthetic gaslight with gradient sections 602 and into the upper section of the synthetic gaslight with gradient sections 602.

Figure 7:
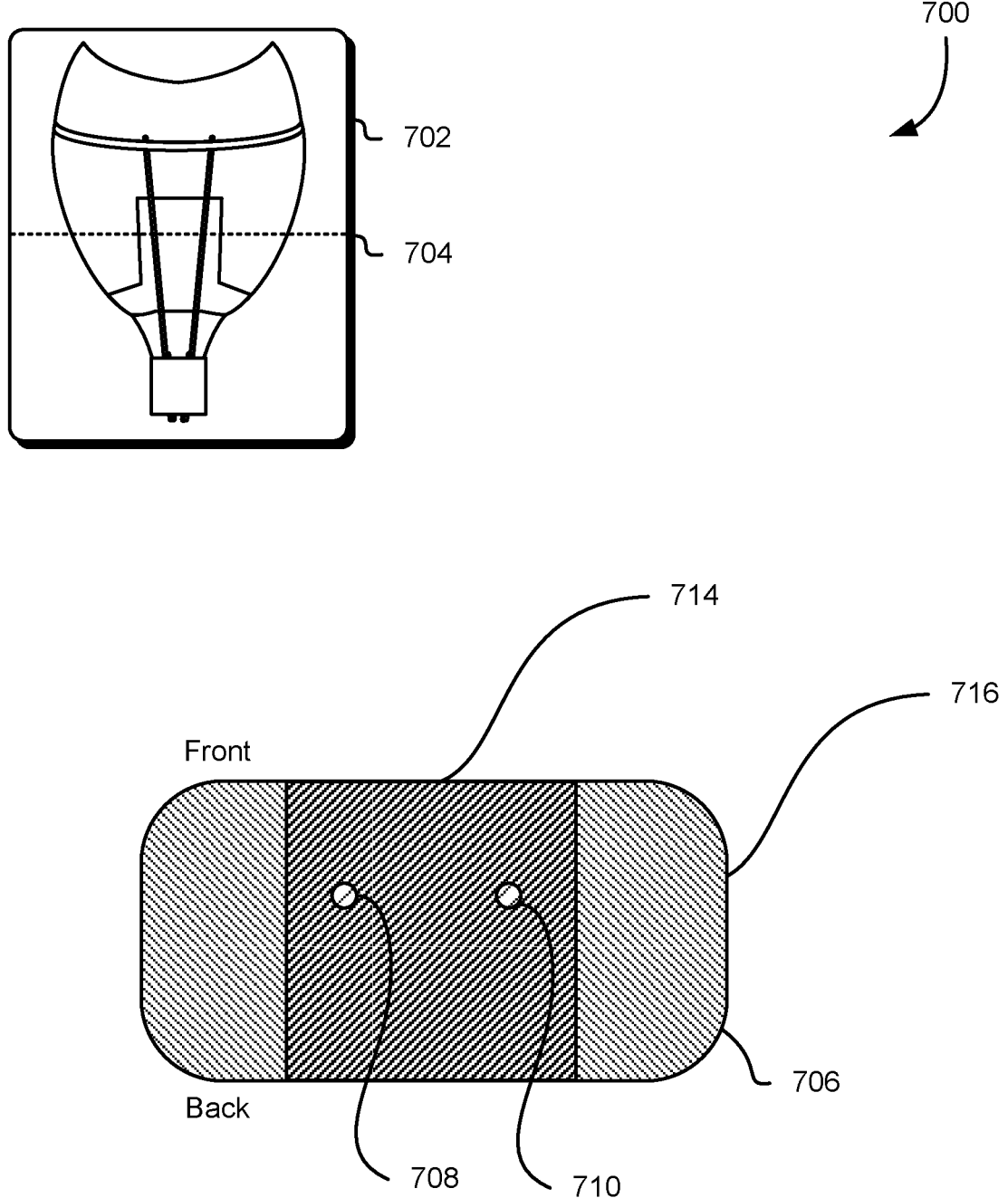
FIG. 7 illustrates a cross-sectional view of an example synthetic gaslight with gradient sections in accordance with an embodiment.

FIG. 7 illustrates a cross-sectional view 700 of a synthetic gaslight with gradient sections 702 such as the example synthetic gaslight with gradient sections 300 described in connection with FIG. 3 and in accordance with an embodiment. As may be contemplated, aspects of the cross-sectional view 700 of the synthetic gaslight with gradient sections described in connection with FIG. 7 may also apply to the example synthetic gaslight 100 described in connection with FIG. 1.

The cross-sectional view 700 of the synthetic gaslight with gradient sections 702 illustrated in FIG. 7 shows the cross-section of the synthetic gaslight at a location indicated by the dotted line 704 (i.e., at a location that is above the ignition section of the lower section of the synthetic gaslight with gradient sections 702 and that intersects the ignition transition section of the lower section of the synthetic gaslight with gradient sections 702).

The cross-sectional view 700 of the synthetic gaslight with gradient sections 702 shows a first upper section optical fiber 708, a second upper section optical fiber 710 (indicated by broad diagonal lines rising from right to left) and a lower section 706. In the cross-sectional view 700 of the synthetic gaslight with gradient sections 702 illustrated in FIG. 7 the portion of the lower section 706 illustrated has an ignition transition section 714 (indicated by dark diagonal lines rising from left to right) and an flame section 716 (indicated by diagonal lines rising from right to left). As described above, the first upper section optical fiber 708 and the second upper section optical fiber 710 continue through the lower section and the opaque isolation section of the synthetic gaslight with gradient sections 702 and into the upper section of the synthetic gaslight with gradient sections 702.

Figure 8:
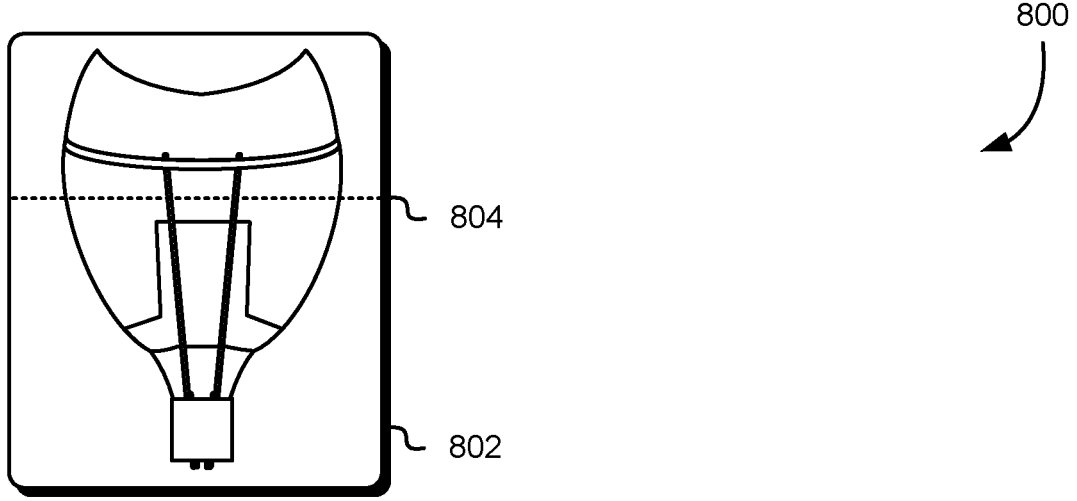
FIG. 8 illustrates a cross-sectional view of an example synthetic gaslight with gradient sections in accordance with an embodiment.
Figure 8:
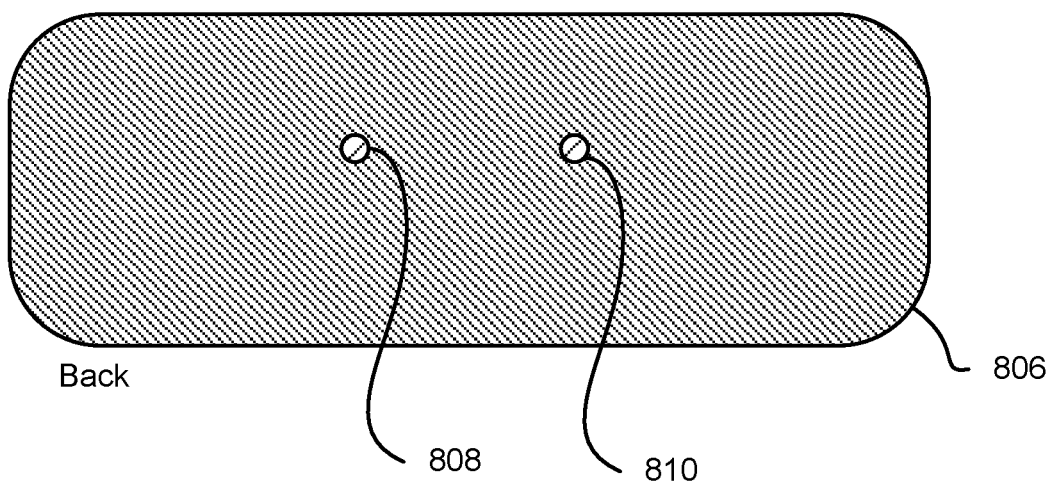

FIG. 8 illustrates a cross-sectional view 800 of a synthetic gaslight with gradient sections 802 such as the example synthetic gaslight with gradient sections 300 described in connection with FIG. 3 and in accordance with an embodiment. As may be contemplated, aspects of the cross-sectional view 800 of the synthetic gaslight with gradient sections described in connection with FIG. 8 may also apply to the example synthetic gaslight 100 described in connection with FIG. 1.

The cross-sectional view 800 of the synthetic gaslight with gradient sections 802 illustrated in FIG. 8 shows the cross-section of the synthetic gaslight at a location indicated by the dotted line 804 (i.e., at a location that is above the ignition transition section of the lower section of the synthetic gaslight with gradient sections 802 and that is below the opaque isolation section of the synthetic gaslight with gradient sections 802).

The cross-sectional view 800 of the synthetic gaslight with gradient sections 802 shows a first upper section optical fiber 808, a second upper section optical fiber 810 (indicated by broad diagonal lines rising from right to left) and a lower section 806 (indicated by diagonal lines rising from right to left). In the cross-sectional view 800 of the synthetic gaslight with gradient sections 802 illustrated in FIG. 8 the lower section 806 illustrated is a flame section, as described herein. As described above, the first upper section optical fiber 808 and the second upper section optical fiber 810 continue through the lower section and the opaque isolation section of the synthetic gaslight with gradient sections 802 and into the upper section of the synthetic gaslight with gradient sections 802.

Figure 9:
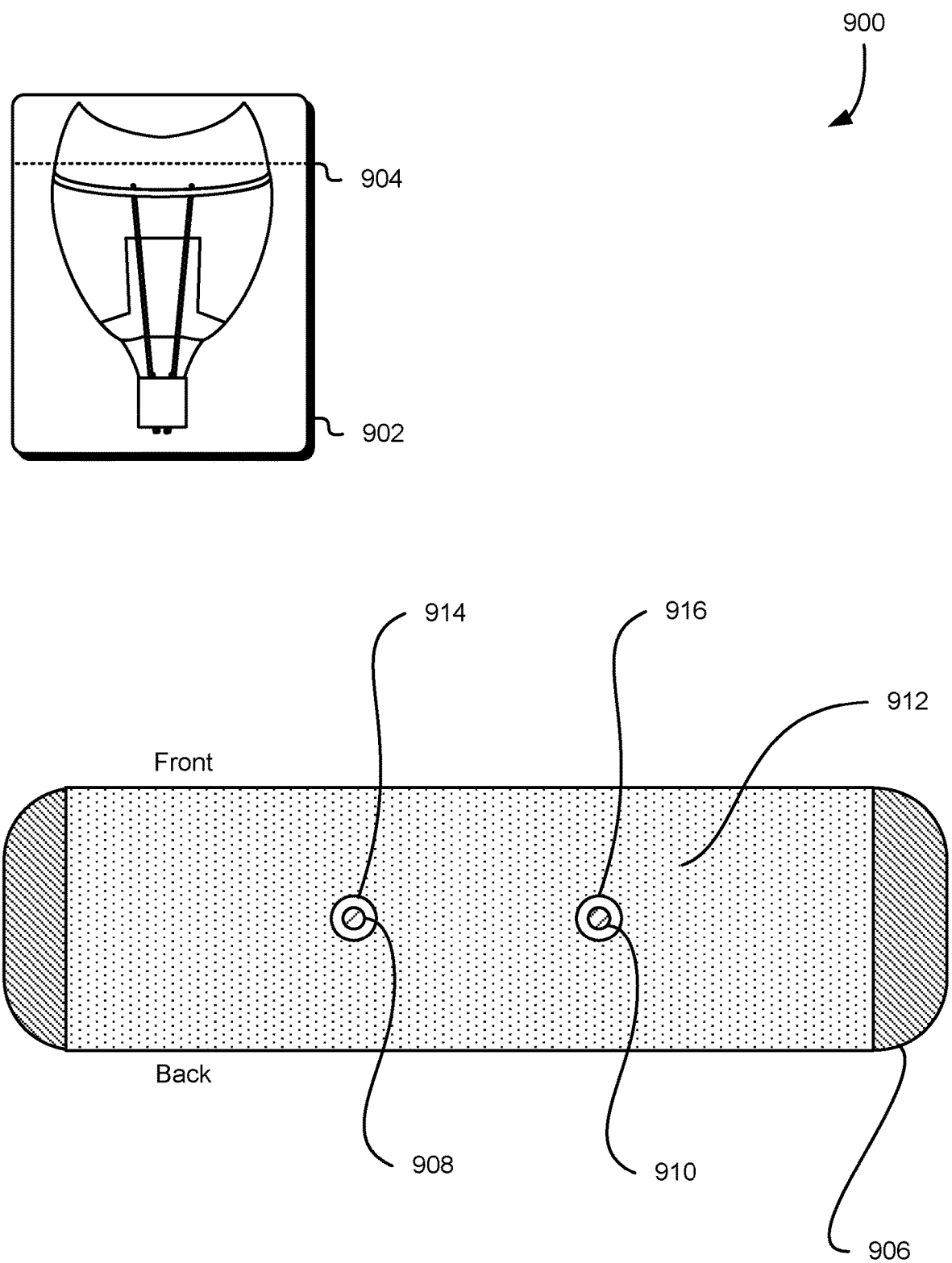
FIG. 9 illustrates a top view of an example synthetic gaslight with gradient sections in accordance with an embodiment.

FIG. 9 illustrates a top view 900 of a synthetic gaslight with gradient sections 902 such as the example synthetic gaslight with gradient sections 300 described in connection with FIG. 3 and in accordance with an embodiment. As may be contemplated, aspects of the top view 900 of the synthetic gaslight with gradient sections described in connection with FIG. 9 may also apply to the example synthetic gaslight 100 described in connection with FIG. 1.

The top view 900 of the synthetic gaslight with gradient sections 902 illustrated in FIG. 9 shows a cross-section of the synthetic gaslight as viewed from a location above the location indicated by the dotted line 904 (i.e., at a location that is above the opaque isolation section of the synthetic gaslight with gradient sections 902 and that is within the top section of the synthetic gaslight with gradient sections 902). The top view 900 of the synthetic gaslight with gradient sections 902 illustrated in FIG. 9 is a view of the synthetic gaslight with gradient sections 902 with the section above the dotted line 904 removed.

The top view 900 of the synthetic gaslight with gradient sections 902 shows a first upper section optical fiber 908, a second upper section optical fiber 910 (indicated by broad diagonal lines rising from right to left), a lower section 906 (indicated by diagonal lines rising from right to left), and an opaque isolation section 912 (indicated by dots). In the top view 900 of the synthetic gaslight with gradient sections 902 illustrated in FIG. 9 the lower section 906 illustrated is a flame section, as described herein. In the top view 900 of the synthetic gaslight with gradient sections 902 illustrated in FIG. 9, the first upper section optical fiber 908 passes through the opaque isolation section 912 via a first hole in the opaque isolation section 914 and the second upper section optical fiber 910 passes through the opaque isolation section 912 via a second hole in the opaque isolation section 916. As may be contemplated, the first hole in the opaque isolation section 914 and the second hole in the opaque isolation section 916 are not illustrated to scale. In an embodiment, the first hole in the opaque isolation section 914 and the second hole in the opaque isolation section 916 are the same size as a cross-section of the upper section optical fibers.

It should be noted that the first upper section optical fiber 908 and the second upper section optical fiber 910 terminate below the location indicated by the dotted line 904 (i.e., the emission end of the first upper section optical fiber 908 and the emission end of the second upper section optical fiber 910 are below the location indicated by the dotted line 904. In an embodiment, the first upper section optical fiber 908 and the second upper section isolation fiber 910 pass through the opaque isolation section and into the upper section of the synthetic gaslight. In an embodiment, the first upper section optical fiber 908 and the second upper section isolation fiber 910 pass through the opaque isolation section but not pass into the upper section of the synthetic gaslight. In the top view 900 of the synthetic gaslight with gradient sections 902 illustrated in FIG. 9, the first upper section optical fiber 908 and the second upper section isolation fiber 910 are shown as extending above the opaque isolation section to clarify the drawing.

Figure 10:
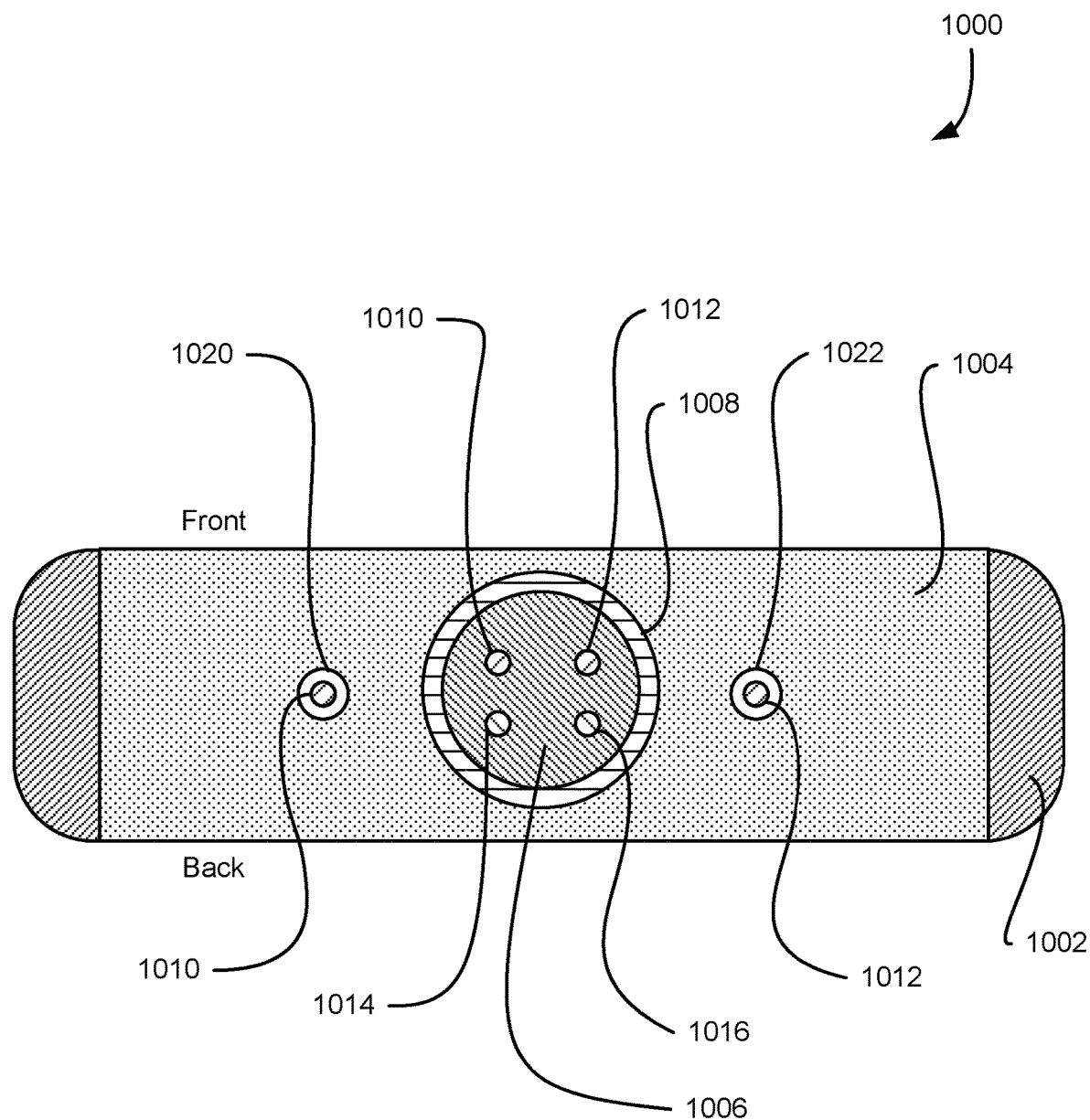
FIG. 10 illustrates a bottom view of an example synthetic gaslight in accordance with an embodiment.

FIG. 10 illustrates a bottom view 1000 of a synthetic gaslight such as the example synthetic gaslight 100 described in connection with FIG. 1 and in accordance with an embodiment. As may be contemplated, aspects of the bottom view 1000 of the synthetic gaslight described in connection with FIG. 10 may also apply to the example synthetic gaslight with gradient sections 300 described in connection with FIG. 3. In the bottom view 1000 of a synthetic gaslight illustrated in FIG. 10, the gradient sections have been omitted for clarity. The bottom view 1000 of the synthetic gaslight illustrated in FIG. 10 shows the synthetic gaslight as viewed from a location below the bottom of the mounting stub of the synthetic gaslight.

The bottom view 1000 of the synthetic gaslight shows a first upper section optical fiber 1010, a second upper section optical fiber 1012 (indicated by broad diagonal lines rising from right to left), a first lower section optical fiber 1014 and a second lower section optical fiber 1016 (indicated by broad diagonal lines rising from left to right), a mounting stub 1008 (indicated by broad horizontal lines) that surrounds a lower section 1006 (indicated by narrow diagonal lines rising from right to left), an opaque isolation section 1004 (indicated by dots), and an upper section 1002 (indicated by narrow diagonal lines rising from left to right). In the bottom view 1000 of the synthetic gaslight, the lower section of the gaslight below the opaque isolation section 1004 and above the mounting stub 1012 has been omitted for clarity.

The bottom view 1000 of the synthetic gaslight shows the upper portion of the first upper section optical fiber 1010 passing through the opaque isolation section 1004 via the first hole 1020 and into the upper section 1002 and the upper portion of the second upper section optical fiber 1012 passing through the opaque isolation section 1004 via the second hole 1022 and into the upper section 1002 as described herein.

Figure 11:
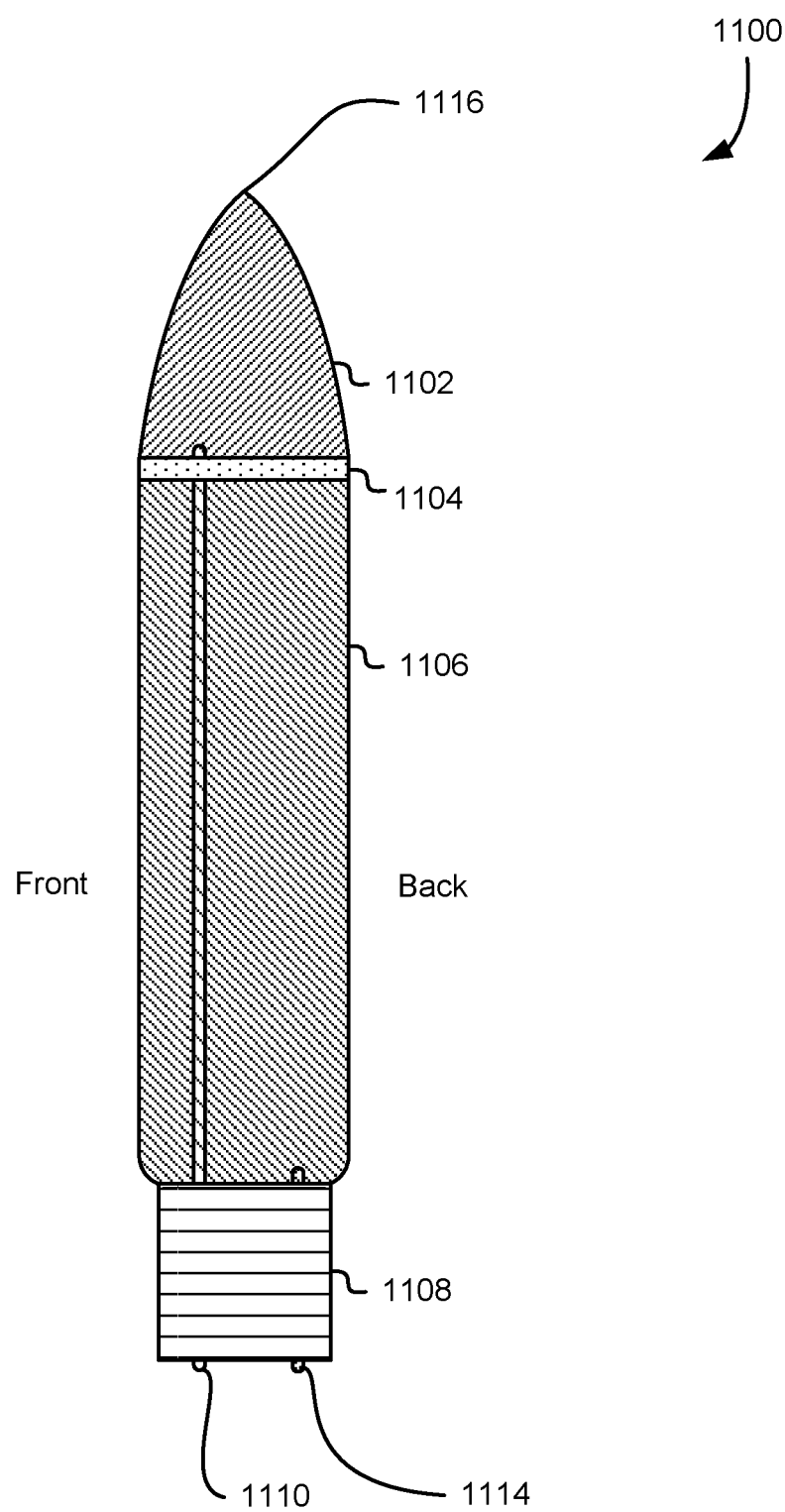
FIG. 11 illustrates a side view of an example synthetic gaslight in accordance with an embodiment.

FIG. 11 illustrates a side view 1100 of a synthetic gaslight such as the example synthetic gaslight 100 described in connection with FIG. 1 and in accordance with an embodiment. As may be contemplated, aspects of the side view 1100 of the synthetic gaslight described in connection with FIG. 11 may also apply to the example synthetic gaslight with gradient sections 300 described in connection with FIG. 3.

The side view 1100 of the synthetic gaslight shows an upper section optical fiber 1110 (indicated by broad diagonal lines rising from right to left), a lower section optical fiber 1114 (indicated by broad diagonal lines rising from left to right), and a mounting stub 1108 (indicated by broad horizontal lines) that is attached to a lower section 1106 (indicated by narrow diagonal lines rising from right to left) as described above. The side view 1100 of the synthetic gaslight omits the second upper section optical fiber and the second lower section optical fiber for clarity.

The side view 1100 of the synthetic gaslight also shows an opaque isolation section 1104 (indicated by dots) that is attached to the upper portion of the lower section 1106 and an upper section 1102 (indicated by narrow diagonal lines rising from left to right) that is attached to the upper portion of the opaque isolation section 1104. A flame tip 1116, located at the top of the upper section 1102 is also shown in the side view 1100 of the synthetic gaslight illustrated in FIG. 11.

The side view 1100 of the synthetic gaslight shows the upper section optical fiber 1110 passing through the lower section 1106, through the opaque isolation section 1104, and terminating (i.e., having an emission end) in the upper section 1102 as described above. The side view 1100 of the synthetic gaslight also shows the upper section optical fiber 1110 terminating (i.e., having an emission end) in the lower section 1106 as described above.

Figure 12:
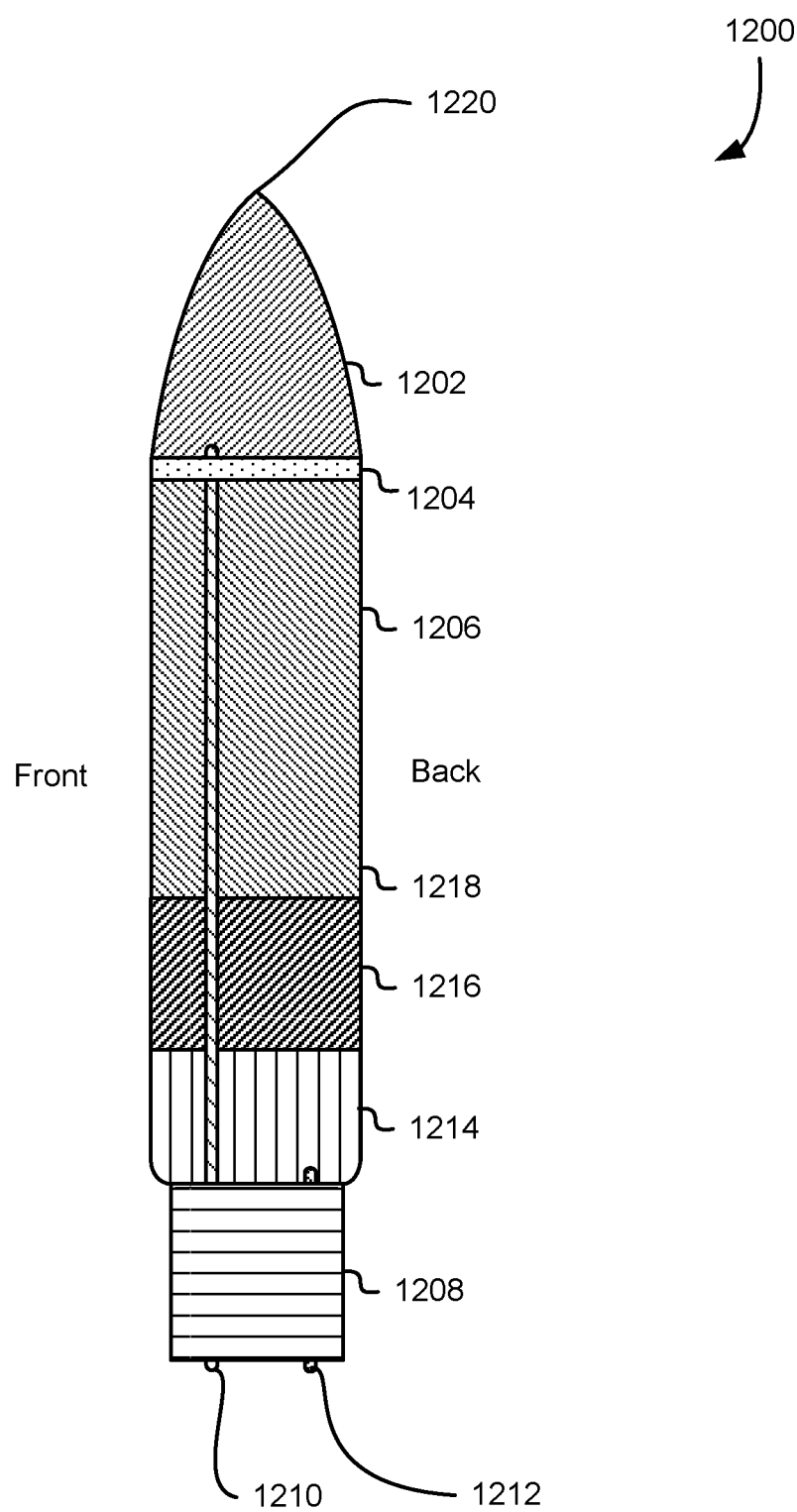
FIG. 12 illustrates a side view of an example synthetic gaslight with gradient sections in accordance with an embodiment.

FIG. 12 illustrates a side view 1200 of a synthetic gaslight with gradient sections such as the example synthetic gaslight with gradient sections 300 described in connection with FIG. 3 and in accordance with an embodiment. As may be contemplated, aspects of the side view 1200 of the synthetic gaslight with gradient sections described in connection with FIG. 12 may also apply to the example synthetic gaslight 100 described in connection with FIG. 1.

The side view 1200 of the synthetic gaslight with gradient sections shows an upper section optical fiber 1210 (indicated by broad diagonal lines rising from right to left), a lower section optical fiber 1212 (indicated by broad diagonal lines rising from left to right), and a mounting stub 1208 (indicated by broad horizontal lines) that is attached to a lower section 1206 as described above. The side view 1200 of the synthetic gaslight omits the second upper section optical fiber and the second lower section optical fiber for clarity.

The side view 1200 of the synthetic gaslight with gradient sections shows a lower section 1206 with an ignition section 1214, an ignition gradient section 1216, and a flame section 1218 as described above. The side view 1200 of the synthetic gaslight with gradient sections also shows an opaque isolation section 1204 (indicated by dots) that is attached to the upper portion of the lower section 1206 and an upper section 1202 (indicated by narrow diagonal lines rising from left to right) that is attached to the upper portion of the opaque isolation section 1204. A flame tip 1220, located at the top of the upper section 1202 is also shown in the side view 1200 of the synthetic gaslight with gradient sections illustrated in FIG. 12.

The side view 1200 of the synthetic gaslight with gradient sections shows the upper section optical fiber 1210 passing through the lower section 1106 (including through the ignition section 1214, the ignition gradient section 1216, and the flame section 1218), through the opaque isolation section 1204, and terminating (i.e., having an emission end) in the upper section 1202 as described above. The side view 1200 of the synthetic gaslight with gradient sections also shows the lower section optical fiber 1212 terminating (i.e., having an emission end) in the ignition section 1214 of the lower section 1206 as described above.

Figure 13:
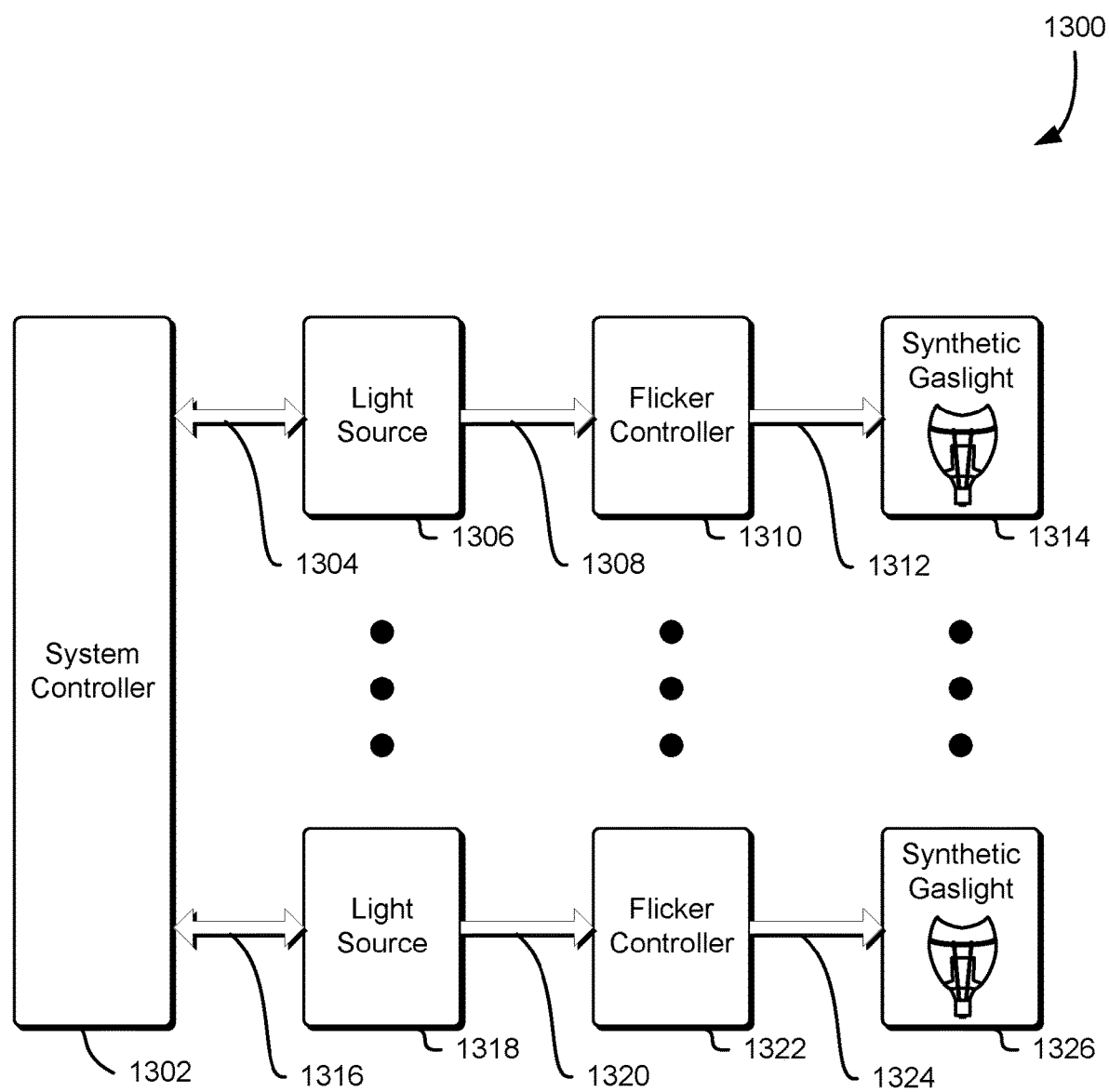
FIG. 13 illustrates an example environment for using a synthetic gaslight in accordance with an embodiment.

FIG. 13 illustrates an example environment 1300 for using a synthetic gaslight with gradient sections such as the example synthetic gaslight with gradient sections 300 described in connection with FIG. 3 and in accordance with an embodiment. As may be contemplated, aspects of the example environment 1300 for using the synthetic gaslight with gradient sections described in connection with FIG. 13 may also apply to the example synthetic gaslight 100 described in connection with FIG. 1.

In the example environment 1300 for using a synthetic gaslight with gradient sections illustrated in FIG. 13, a system controller 1302 is connected using a connection 1304 to a light source 1306. In an embodiment, the system controller is a computing device such as the example computing device 1602 described below. In an embodiment, the light source 1306 is a fiberoptic projector. In an embodiment, the connection 1304 is a wired connection that sends and receives signals between the system controller 1302 and the light source 1306. In an embodiment, the connection 1304 is a wireless connection, including, but not limited to, a Wi-Fi connection, a Bluetooth connection, or other such wireless connection. In such an embodiment, the connection 1304 sends and receives signals between the system controller 1302 and the light source 1306. In such embodiments, the connection 1304 between the system controller 1302 and the light source 1306 is configured such that the system controller 1302 can adjust the intensity, color, and other properties of the light from the light source 1306.

The adjusted light from the light source 1306 is delivered 1308 to a flicker controller 1310 that further adjusts the delivered light by flickering the light according to the flicker parameters described herein. In an embodiment, the light source 1306 and the flicker controller 1310 are combined into a single unit as described herein. In an embodiment, the adjusted light from the light source 1306 is delivered 1308 to a flicker controller 1310 using optical fibers such as those described herein.

The flickering light from the flicker controller 1310 is delivered to 1312 the synthetic gaslight 1314 for synthesis as described herein. In an embodiment, the synthetic gaslight is a synthetic gaslight with gradient sections as described herein. In an embodiment, the flickering light from the flicker controller 1310 is delivered 1312 to the synthetic gaslight 1314 using optical fibers such as those described herein. In such an embodiment, the flickering light from the flicker controller 1310 is delivered 1312 by providing the flickering light to the source end of the one or more optical fibers of the synthetic gaslight 1314.

In an embodiment, the flicker controller 1310 and the synthetic gaslight 1314 are a single unit. In an embodiment, the light source 1306, the flicker controller 1310, and the synthetic gaslight 1314 are a single unit.

The example environment 1300 for using a synthetic gaslight with gradient sections illustrated in FIG. 13 illustrates a plurality of light sources, flicker controllers, and synthetic gaslights. In particular, the example environment 1300 for using a synthetic gaslight with gradient sections illustrated in FIG. 13 illustrates the system controller 1302 connected 1316 to a second light source 1318, which delivers 1320 light from the second light source 1318 to a second flicker controller 1322. Light from the second flicker controller is then delivered 1324 to the second synthetic gaslight 1328 which, in an embodiment, is a synthetic gaslight with gradient sections as described herein.

In an embodiment, there is one system controller 1302 for a plurality of light sources such as the light source 1306 and the light source 1318. In an embodiment, there is one system controller 1302 for each light source such as the light source 1306 and the light source 1318.

In an embodiment, there is one light source such as the light source 1306 and the light source 1318 for a plurality of flicker controllers such as the flicker controller 1310 and the flicker controller 1322. In an embodiment, there is one light source such as the light source 1306 and the light source 1318 for each flicker controller such as the flicker controller 1310 and the flicker controller 1322.

In an embodiment, there is one flicker controller such as the flicker controller 1310 and the flicker controller 1322 for a plurality of synthetic gaslights such as the synthetic gaslight 1314 and the synthetic gaslight 1326. In an embodiment, there is one flicker controller such as the flicker controller 1310 and the flicker controller 1322 for each synthetic gaslight such as the synthetic gaslight 1314 and the synthetic gaslight 1326.

As may be contemplated, other arrangements of system controllers such as the system controller 1302, light sources such as the light source 1306 and the light source 1318, flicker controllers such as the flicker controller 1310 and the flicker controller 1322, and synthetic gaslights such as the synthetic gaslight 1314 and the synthetic gaslight 1326 may be considered as within the scope of this disclosure.

Figure 14:
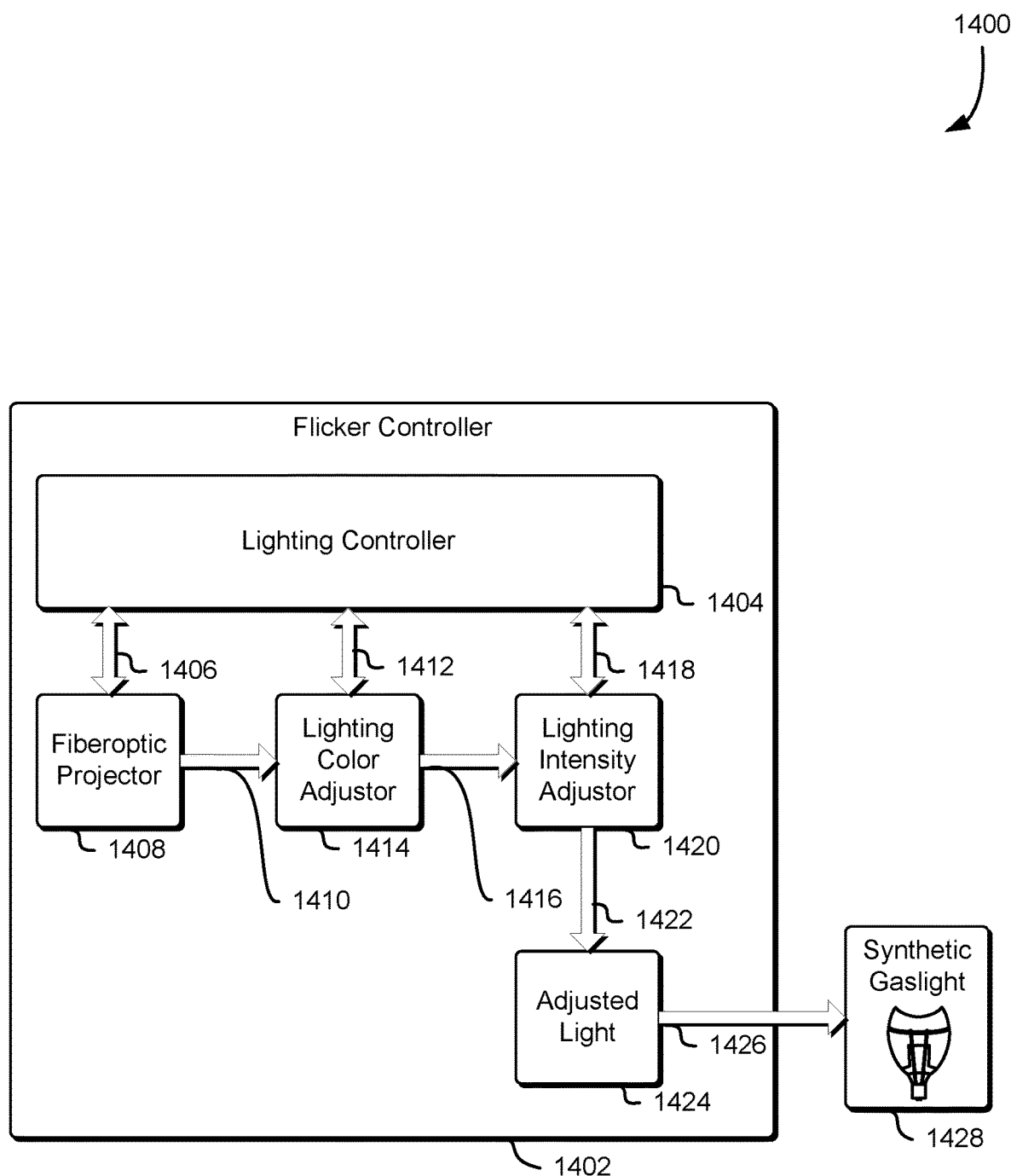
FIG. 14 illustrates an example environment for varying the color and intensity of a synthetic gaslight in accordance with an embodiment.

FIG. 14 illustrates an example environment 1400 for varying the color and intensity of a synthetic gaslight with gradient sections such as the example synthetic gaslight with gradient sections 300 described in connection with FIG. 3 and in accordance with an embodiment. As may be contemplated, aspects of the example environment 1400 for varying the color and intensity of a synthetic gaslight with gradient sections described in connection with FIG. 14 may also apply to the example synthetic gaslight 100 described in connection with FIG. 1.

The example environment 1400 illustrated in FIG. 14 shows a flicker controller 1402 that produces adjusted light 1424 and delivers 1426 that adjusted light to a synthetic gaslight 1428 such as those described herein using optical fibers such as those described herein. In the example environment 1400 illustrated in FIG. 14, the flicker controller 1402 includes a lighting controller 1404 that is integrated with the flicker controller 1402 as described above at least in connection with FIG. 13.

The example environment 1400 illustrated in FIG. 14 shows the lighting controller 1404 connected 1406 to a fiberoptic projector 1408 such that the lighting controller 1404 can control the fiberoptic projector 1408 (i.e., can turn the projector on and off and/or control other aspects of the lighting projector operation). In an embodiment, the lighting controller 1404 is connected 1406 to the fiberoptic projector 1408 using a wired connection as described herein. In an embodiment, the lighting controller 1404 is connected 1406 to the fiberoptic projector 1408 using a wireless connection as described herein.

The example environment 1400 illustrated in FIG. 14 shows the lighting controller 1404 connected 1412 to a lighting color adjuster 1414 such that the lighting controller 1404 can control the lighting color adjuster 1414 (i.e., can alter the color of the light received from the fiberoptic projector 1408). In an embodiment, the lighting controller 1404 is connected 1412 to the lighting color adjuster 1414 using a wired connection as described herein. In an embodiment, the lighting controller 1404 is connected 1412 to the lighting color adjuster 1414 using a wireless connection as described herein. In an embodiment, the lighting color adjuster 1414 is a series of colored lighting gels that can be selected by the lighting controller 1404. In such an embodiment, the colored lighting gels are mounted on a wheel and the lighting controller 1404 selects a lighting color by rotating the wheel to the appropriate colored lighting gel.

The example environment 1400 illustrated in FIG. 14 shows the lighting controller 1404 connected 1418 to a lighting intensity adjuster 1420 such that the lighting controller 1404 can control the lighting intensity adjuster 1420 (i.e., can alter the intensity of the colored light received from the fiberoptic projector 1408 and the lighting color adjuster 1414). In an embodiment, the lighting controller 1404 is connected 1418 to the lighting intensity adjuster 1420 using a wired connection as described herein. In an embodiment, the lighting controller 1404 is connected 1418 to the lighting intensity adjuster 1420 using a wireless connection as described herein. In an embodiment, the lighting intensity adjuster 1420 is a wheel with one or more perforations that adjust the amount of light emitted from the lighting intensity adjuster. In such an embodiment, the lighting controller 1404 selects a lighting intensity by rotating the wheel to the appropriate perforations.

In the example environment 1400 illustrated in FIG. 14, the lighting controller 1404 controls the fiberoptic projector 1408, which provides light 1410 to the lighting color adjuster 1414. The lighting controller 1404 then controls the lighting color adjuster to adjust the color of the light 1410 from the fiberoptic projector 1408. The colored light 1416 is then provided to the lighting intensity adjuster 1420. The lighting controller 1404 then controls the lighting intensity adjuster 1420 to adjust the intensity of the colored light 1416 from the lighting color adjuster 1414 and to produce 1422 the adjusted light 1424. The flicker controller 1402 then delivers 1426 that adjusted light (i.e., the color adjusted, and intensity adjusted light) to the synthetic gaslight 1428 as described herein.

In an embodiment, the lighting controller is configured to bypass one or both of the lighting color adjuster 1414 and the lighting intensity adjuster 1420 so that, for example, the adjusted light is just light from the fiberoptic projector 1408, or is just colored light from the lighting color adjuster 1414, or is uncolored light from the fiberoptic projector that is intensity adjusted by the lighting intensity adjuster 1420.

In an embodiment, the flicker controller 1402 is connected to multiple synthetic gaslights such as the synthetic gaslight 1428.

In an embodiment one or more aspects of the flicker controller 1402 including, but not limited to, the lighting controller 1404, the fiberoptic projector 1408, the lighting color adjuster 1414, and the lighting intensity adjuster 1420, are combined into single units. For example, in an embodiment, the lighting color adjuster 1414 and the lighting intensity adjuster 1420 are a single unit. As may be contemplated, other combinations of elements of the flicker controller into combination elements may be considered as within the scope of this disclosure.

Figure 15:
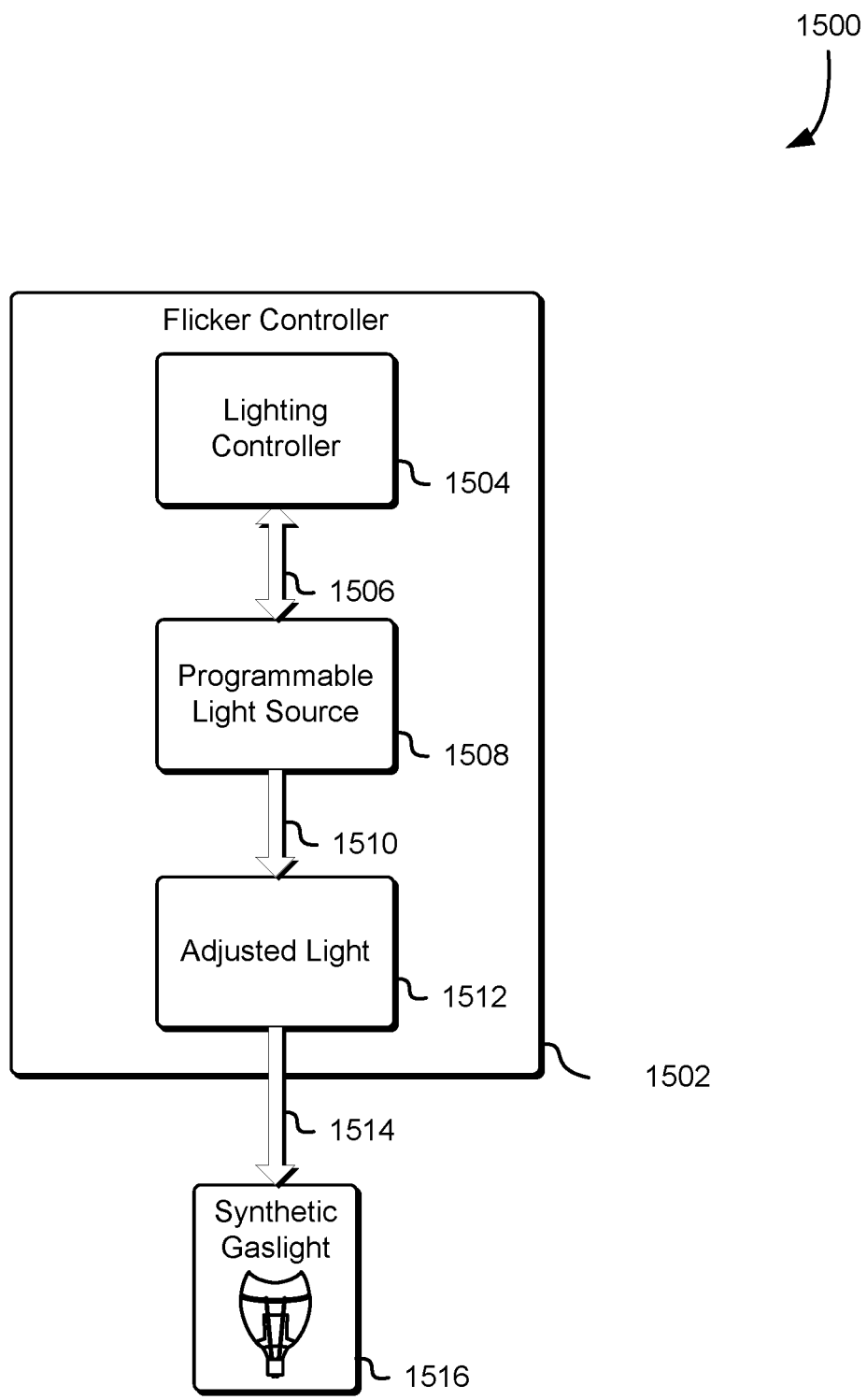
FIG. 15 illustrates an example environment for varying the color and intensity of a synthetic gaslight in accordance with an embodiment.

FIG. 15 illustrates an example environment 1500 for varying the color and intensity of a synthetic gaslight with gradient sections such as the example synthetic gaslight with gradient sections 300 described in connection with FIG. 3 and in accordance with an embodiment. As may be contemplated, aspects of the example environment 1500 for varying the color and intensity of a synthetic gaslight with gradient sections described in connection with FIG. 15 may also apply to the example synthetic gaslight 100 described in connection with FIG. 1.

The example environment 1500 illustrated in FIG. 15 shows a flicker controller 1502 that produces adjusted light 1512 and delivers 1514 that adjusted light to a synthetic gaslight 1518 such as those described herein using optical fibers such as those also described herein. In the example environment 1500 illustrated in FIG. 15, the flicker controller 1502 includes a lighting controller 1504 that is integrated with the flicker controller 1502 as described above at least in connection with FIG. 13.

In the example environment 1500 illustrated in FIG. 15, the lighting controller 1504 is connected 1506 to a programmable light source 1508 such that the lighting controller 1504 can control the programmable light source 1508. Examples of the lighting controller 1504 controlling the programmable light source 1508 include, but are not limited to, turning the programmable light source 1508 on or off, changing the color of the programmable light source 1508, changing the intensity of the programmable light source 1508, and other such aspects of the programmable light source 1508. The programmable light source then provides 1510 the adjusted light 1512 which the flicker controller 1502 then delivers 1514 to the synthetic gaslight 1516 as described herein.

In an embodiment, the programmable light source 1508 is a programmable LED, which can be turned on and off, adjusted for color, and adjusted for intensity using a lighting control protocol such as those described above. In an embodiment, the programmable LED is three programmable LEDs (i.e., one each of red, green, and blue) that, together, provide different color adjusted and intensity adjusted light using a lighting protocol such as those described herein.

As may be contemplated, although the example environment 1500 illustrated in FIG. 15 shows a single synthetic gaslight such as the synthetic gaslight 1516, the flicker controller 1502 may provide adjusted light 1512 to a plurality of synthetic gaslights such as the synthetic gaslight 1516. In an embodiment, the programmable light source 1508 is a LED array with a plurality of programmable LEDs. In such an embodiment, one or more synthetic gaslights such as the synthetic gaslight 1516 are connected to the LED array, which is controlled by the lighting controller 1504. In an embodiment, each of the one or more synthetic gaslights such as the synthetic gaslight 1516 receives the same adjusted light such as the adjusted light 1512 from the flicker controller 1502. In an embodiment, each of the one or more synthetic gaslights such as the synthetic gaslight 1516 receives a different adjusted light such as the adjusted light 1512 from the flicker controller 1502.

Figure 16:
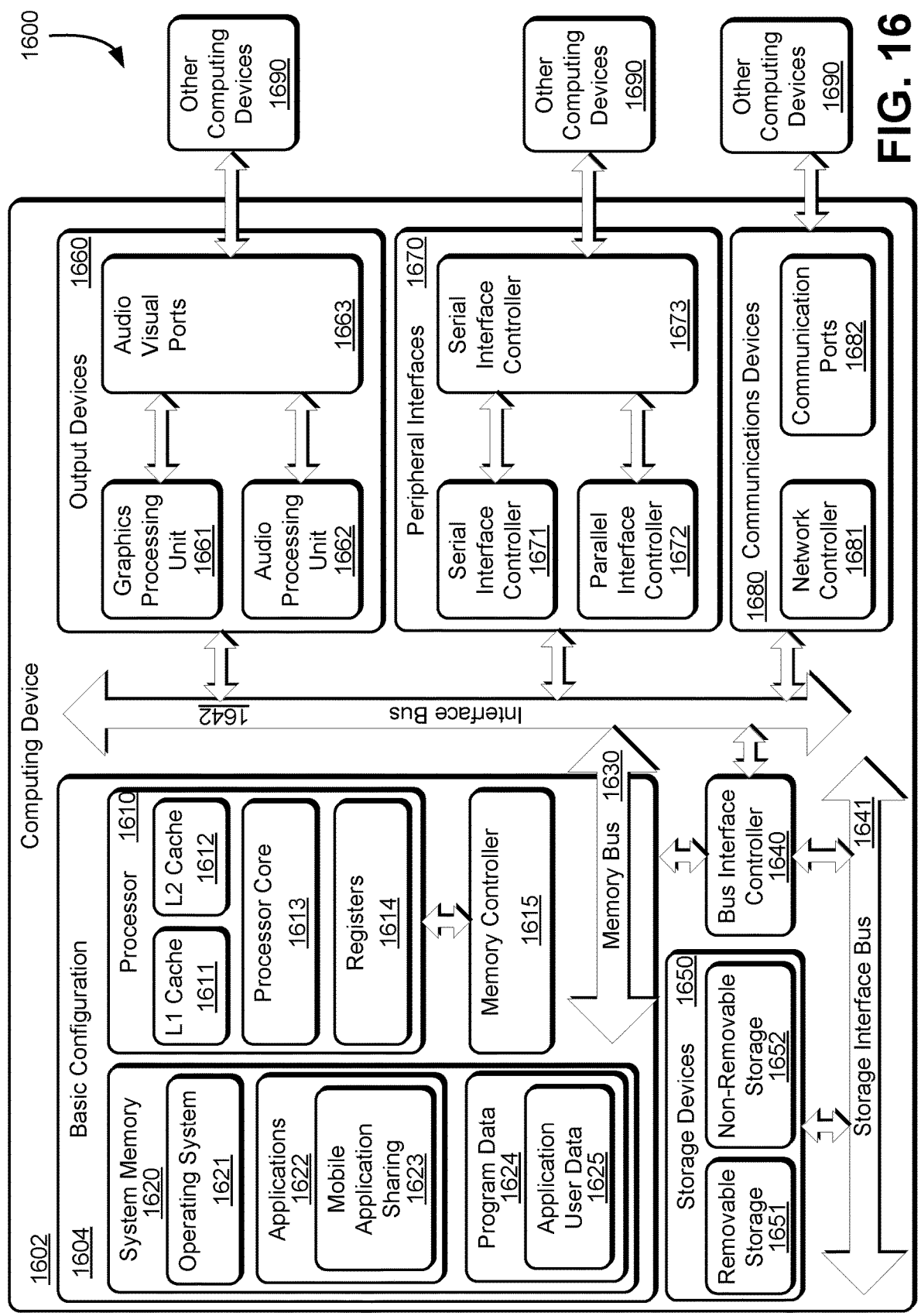
FIG. 16 illustrates an example computing system in which aspects of various embodiments can be implemented.

FIG. 16 illustrates an example environment 1600 with an example computing device 1602 that may be used to implement one or more embodiments, in accordance with the present disclosure. In a basic configuration 1604, an example computing device 1602 may include one or more processors 1610 and may include memory such as system memory 1620. A memory bus 1630 may be used for communicating between a processor 1610 of the example computing device 1602 and the system memory 1620. The example computing device 1602 may include any appropriate device operable to send and/or receive requests, messages, or information over an appropriate network and may, in some embodiments, convey information back to a user of the computing device in response to such requests. Examples of such computing devices include personal computers, cell phones, handheld messaging devices, laptop computers, tablet computers, set-top boxes, personal data assistants, mobile devices, wearable devices, embedded computer systems, electronic book readers, application specific client devices and the like. The network may include any appropriate network, including an intranet, the Internet, a cellular network, a local area network, a satellite network or any other such network and/or combination thereof. Communication over the network can be enabled by wired or wireless connections and combinations thereof.

The information (also referred to herein as "content") conveyed back to the user of the example computing device 1602 may include, but may not be limited to, text, graphics, audio, video, and/or other content usable to be provided to the user. The information conveyed back to the user of the computing device may be conveyed in the form of Hyper- Text Markup Language ("HTML"), Extensible Markup Language ("XML"), JavaScript, Cascading Style Sheets ("CSS"), or some other such client-side structured language. Content may be processed by the example computing device 1602 to provide the content to the user of the example computing device 1602 in one or more forms including, but not limited to, forms that are perceptible to the user audibly, visually and/or through other senses including touch, taste, and/or smell. Requests and responses sent over the network may be handled by a server using PHP: Hypertext Preprocessor ("PHP"), Python, Ruby, Perl, Java, HTML, XML, or another appropriate server-side structured language. It should be understood that operations described herein as being performed by a single device may, unless otherwise clear from context, be performed collectively by multiple devices.

In some embodiments, the processor 1610 may be of a type including but not limited to a microprocessor, a microcontroller, a digital signal processor ("DSP"), or any combination thereof. A processor 1610 may include one more levels of caching, such as a level one ("L1") cache 1611 and a level two ("L2") cache 1612. A processor may also include a processor core 1613, and registers 1614. The processor core 1613 may include, for example, an arithmetic logic unit ("ALU"), a floating-point unit ("FPU"), a digital signal processing core ("DSP Core"), a graphics processing unit ("GPU") or a combination of these and/or other such processing units. A memory controller 1615 may also be used with the processor 1610 to control the memory such as the system memory 1620. In some implementations the memory controller 1615 may be an internal part of the processor 1610.

In some embodiments, the system memory 1620 may be of any type including but not limited to volatile memory (such as RAM), non-volatile memory (such as ROM, flash memory, etc.) or any combination thereof. System memory 1620 may contain an operating system 1621, one or more applications 1622, and program data 1624 associated with such applications 1622. An application such as the applications 1622 may include a component 1623 configured for sharing applications between mobile devices in a peer-to-peer environment, in accordance with the present disclosure. The program Data 1624 may include applicant or organizational data 1625 as described herein. In some embodiments, an application such as the applications 1622 can be arranged to operate with program data 1624 on an operating system 1621 such that operation of a system may be facilitated on general purpose computer systems.

An example computing device 1602 can have additional features or functionality, and additional interfaces to facilitate communications between the basic configuration 1604 and any other devices and interfaces. For example, a bus/interface controller 1640 can be used to facilitate communications between the basic configuration 1604 and one or more data storage devices 1650 via a storage interface bus 1641. The data storage devices 1650 can be removable storage devices 1651, non-removable storage devices 1652, or a combination thereof. Examples of removable storage and non-removable storage devices include magnetic disk devices such as flexible disk drives and hard-disk drives (HOD), optical disk drives such as compact disk ("CD") drives or digital versatile disk ("DVD") drives, solid state drives ("SSD"), and tape drives and/or other such storage devices. Examples of computer storage media may include volatile and nonvolatile, removable and non-removable media implemented in any method or technology for storage of information, such as computer readable instructions, data structures, program modules, or other data.

System memory 1620, removable storage device 1651, and non-removable storage device 1652 are all examples of computer storage media. Computer storage media (or computer-readable medium) includes, but is not limited to, RAM, ROM, EEPROM, flash memory or other memory technology, Compact Disc Read-Only Memory ("CD-ROM"), digital versatile disk ("DVD") or other optical storage, magnetic cassettes, magnetic tape, magnetic disk storage or other magnetic storage devices, or any other medium which can be used to store the desired information and which can be accessed by an example computing device 1602. Any such computer storage media can be part of the example computing device 1602.

The example computing device 1602 may also include an interface bus 1642 for facilitating communication from various interface devices (e.g., output interfaces, peripheral interfaces, and communication interfaces) to the basic configuration 1604 via the bus/interface controller 1640. Example output devices 1660 include a graphics processing unit 1661 and an audio processing unit 1662, which can be configured to communicate to various external devices such as a display or speakers via one or more audio/visual ports 1663. Example peripheral interfaces 1670 include a serial interface controller 1671 or a parallel interface controller 1672, which can be configured to communicate with external devices such as input devices (e.g., keyboard, mouse, pen, voice input device, touch input device, etc.) or other peripheral devices (e.g., printer, scanner, etc.) via one or more I/O ports 1673.

An example communication device 1680 may include a network controller 1681, which can be arranged to facilitate communications with one or more other computing devices 1690 (i.e., computing devices configured with one or more of the capabilities described herein with respect to the example computing device 1602) over a network communication via one or more communication ports 1682. The one or more communication ports 1682 may further include components configured to communicate over a near-area network. Examples of such communication ports 1682 may utilize at least one network for supporting communications using any of a variety of protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS") and Common Internet File System ("CIFS"). The network can be, for example, a local area network, a wide-area network, a virtual private network, the Internet, an intranet, an extranet, a public switched telephone network, an infrared network, a wireless network, a satellite network, and any combination thereof.

An example computing device 1602 may be implemented as a computer such as a laptop computer, a personal computer, a workstation, a server or some other such computer device. A computing device 1602 may also be implemented as a portable (or mobile) computer such as a cell phone, a smart phone, a personal data assistant ("PDA"), a personal media player device, a wireless web-watch device, a personal headset device, an application specific device, or some other such device. A computing device may also be implemented as a combination of computer and/or portable devices including, but not limited to, the devices described herein. An example computing device 1602 may include an operating system that may provide executable program instructions for the general administration and operation of that device and may include a computer-readable storage medium (e.g., a hard disk, random access memory, read only memory, etc.) storing instructions that, when executed by a processor of the device, allow the device to perform its intended functions.

The example computing device 1602 illustrated in the example environment 1600 may be part of a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system illustrated in FIG. 16 should be taken as being illustrative in nature and not limiting to the scope of the disclosure. The various embodiments may also be implemented in a wide variety of operating environments, which in some cases can include one or more computers and/or computing devices that may be used to operate any number of applications. Such devices may include any of a number of general-purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, application specific devices and other devices capable of communicating via a network. These devices also can include virtual devices such as virtual machines and other such virtual devices capable of communicating via a network.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings herein are to be regarded in an illustrative rather than a restrictive sense. It will be evident that various modifications and changes may be made thereunto without departing from the broader spirit and scope of the invention as set forth in the claims.

Other variations are within the spirit, and therefore scope, of the present disclosure. Thus, while the disclosed techniques are susceptible to various modifications and alternative constructions, certain illustrated embodiments thereof are shown in the drawings and have been described above in detail. It should be understood that there is no intention to limit the invention to the specific form or forms disclosed and the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A synthetic gaslight comprising:
    a translucent upper section, attached to a top side of an opaque isolation section, and a translucent lower section attached to a bottom side of the opaque isolation section, the top side of the opaque isolation section being opposite of the bottom side of the opaque isolation section, wherein:
    the translucent upper section simulates a top portion of a simulated gaslight flame using a first set of one or more optical fibers and a first translucent colored material, the first set of one or more optical fibers each illuminated at a corresponding source end using a first light source, the first set of one or more optical fibers each having a corresponding emission end located within the translucent upper section, the first set of one or more optical fibers passing through the translucent lower section, the first set of one or more optical fibers passing through the opaque isolation section;
    the opaque isolation section comprises an opaque material;
    the translucent lower section simulates a bottom portion of the simulated gaslight flame using a second set of one or more optical fibers, the second set of one or more optical fibers each illuminated at a corresponding source end using a second light source, the second set of one or more optical fibers each having a corresponding emission end located within the translucent lower section; and
    the translucent lower section comprises an ignition section, an ignition transition section, and a lower flame body section, wherein:
        the ignition section simulates a flame pre-ignition portion of the bottom portion of the simulated gaslight flame using a transparent colorless material;
        the lower flame body section simulates a lower flame body portion of the bottom portion of the simulated gaslight flame using a second translucent colored material; and
        the ignition transition section simulates a flame ignition transition portion of the bottom portion of the simulated gaslight flame using a third translucent colored material, the flame ignition transition portion of the bottom portion of the simulated gaslight flame located between the flame pre-ignition portion of the bottom portion of the simulated gaslight flame and the lower flame body portion of the bottom portion of the simulated gaslight flame; and
        the corresponding emission end of the each of the second set of one or more optical fibers is located below the ignition section.

2. The synthetic gaslight of claim 1, wherein the opaque isolation section comprises a layer of metallic foil.

3. The synthetic gaslight of claim 1, wherein the first light source includes a flicker controller that flickers the top portion of the simulated gaslight flame by cycling between a first brightness and a second brightness, the second brightness being greater than the first brightness.

4. The synthetic gaslight of claim 1, wherein:
    the first translucent colored material comprises acrylic plastic that displays diffused light from the first light source with a wavelength between 640 to 590 nanometers;

the second translucent colored material comprises acrylic plastic that displays diffused light from the second light source with a wavelength between 640 to 590 nanometers;

the third translucent colored material comprises acrylic plastic that displays a first type of light that is no light from the second light source at a lower section of the ignition transition section, that displays a second type of light that is diffused light from the second light source with a wavelength between 640 to 590 nanometers at an upper section of the ignition transition section, and that displays light that varies between the first type of light and the second type of light between the lower section of the ignition transition section and the upper section of the ignition transition section; and the transparent colorless material comprises acrylic plastic that displays no diffused light from the second light source in the ignition section.

5. The synthetic gaslight of claim 3, wherein the flicker controller comprises:

a fiberoptic projector;

one or more colored lighting gels mounted on a first rotating wheel, the first rotating wheel attached to the fiberoptic projector operable to project a light from the fiberoptic projector through the one or more colored lighting gels;

one or more perforated wheels, attached to the fiberoptic projector operable to project the light from the fiberoptic projector through a set of perforations in the one or more perforated wheels; and a lighting controller programmed to:
vary an amount of illumination of the fiberoptic projector;
vary a position of the first rotating wheel; and
vary a position of the one or more perforated wheels.

6. The synthetic gaslight of claim 3, wherein the flicker controller comprises:

a light emitting diode array comprising one or more light emitting diodes; and a lighting controller programmed to vary a corresponding illumination color and intensity for each of the one or more light emitting diodes.

7. A synthetic gaslight comprising:

a translucent upper section, attached to a top side of an opaque isolation section, and a translucent lower section attached to a bottom side of the opaque isolation section, the top side of the opaque isolation section being opposite of the bottom side of the opaque isolation section, wherein:

the translucent upper section simulates a top portion of a simulated gaslight flame using a first set of one or more optical fibers and a first translucent colored material, the first set of one or more optical fibers each illuminated at a corresponding source end using a first light source, the first set of one or more optical fibers each having a corresponding emission end located within the translucent upper section, the first set of one or more optical fibers passing through the translucent lower section, the first set of one or more optical fibers passing through the opaque isolation section;

the opaque isolation section comprises an opaque material; and the translucent lower section simulates a bottom portion of the simulated gaslight flame using a second set of one or more optical fibers, the second set of one or more optical fibers each illuminated at a corresponding source end using a second light source, the second set of one or more optical fibers each having a corresponding emission end located within the translucent lower section.

8. The synthetic gaslight of claim 7, wherein the translucent lower section comprises an ignition section, an ignition transition section, and a lower flame body section, wherein:

the ignition section simulates a pre-ignition portion of the bottom portion of the simulated gaslight flame using a transparent colorless material;

the ignition transition section simulates a flame ignition transition portion of the bottom portion of the simulated gaslight flame using a second translucent colored material;

the lower flame body section simulates a lower flame body portion of the simulated gaslight flame using a third translucent colored material; and the corresponding emission end of the each of the second set of one or more optical fibers is located below the ignition section.

9. The synthetic gaslight of claim 7, wherein the translucent upper section has one or more flame points located at an upper portion of the translucent upper section, the one or more flame points operable to simulate a shape of the top portion of the simulated gaslight flame.

10. The synthetic gaslight of claim 7, wherein the first light source emits colored light with a wavelength between 640 to 590 nanometers.

11. The synthetic gaslight of claim 7, wherein:

the translucent upper section is attached to the opaque isolation section using ultraviolet adhesive glue; and the translucent lower section is attached to the opaque isolation section using ultraviolet adhesive glue.

12. The synthetic gaslight of claim 8, wherein the first translucent colored material comprises colored acrylic plastic that displays diffused colored light in the translucent upper section with a wavelength between 640 to 590 nanometers.

13. A light fixture comprising a first translucent section attached to an opaque section on a first side of the opaque section and a second translucent section attached to the opaque section on a second side of the opaque section, the second side of the opaque section being opposite the first side of the opaque section, wherein:

the first translucent section is made using a first colored translucent material;

the first translucent section simulates a top portion of a simulated gaslight flame using a first light transmission medium, the first light transmission medium operable to maintain a flickering illumination in the first translucent section;

the second translucent section is made using a second colored translucent material;

the second translucent section simulates a bottom portion of the simulated gaslight flame using a second light transmission medium, the second light transmission medium operable to maintain a constant illumination in the second translucent section;

the opaque section is made using an opaque material; and the opaque section optically isolates the first translucent section from the second translucent section.

14. The light fixture of claim 13, wherein the second translucent section further comprises an ignition section, an ignition transition section, and a lower flame body section, wherein:

the ignition section simulates a flame pre-ignition portion of the bottom portion of the simulated gaslight flame using a transparent colorless material;

the ignition transition section simulates a flame ignition transition portion of the bottom portion of the simulated gaslight flame using the second translucent colored material; and the lower flame body section that simulates a lower flame body portion of the bottom portion of the simulated gaslight flame using a third translucent colored material.

15. The light fixture of claim 13, further comprising a stub attached to a lower portion of the second translucent section, the lower portion of the second translucent section located opposite the opaque section, wherein:

the stub simulates a gas pipe and a gas burner; and the stub is usable to mount the light fixture.

16. The light fixture of claim 13, wherein the first translucent section and the second translucent section are coated with a coating comprising a polyurethane base, an acrylic-specific adhesion promoter, and one or more light diffusion additives.

17. The light fixture of claim 13, wherein:

the first translucent section is abraded to increase an amount of diffusion of light in the first translucent section; and the second translucent section is abraded to increase an amount of diffusion of light in the second translucent section.

18. The light fixture of claim 13, wherein the light fixture is a synthetic gaslight operable as a light bulb in an existing lighting system.

19. The light fixture of claim 14, wherein:

the first light transmission medium is a first set of one or more optical fibers;

the second light transmission medium is a second set of one or more optical fibers;

a corresponding emission end of the each of the first set of one or more optical fibers is located above the opaque section; and a corresponding emission end of the each of the second set of one or more optical fibers is located below the ignition section of the second translucent section.

20. The light fixture of claim 16, wherein the one or more light diffusion additives are glass microspheres.

* * * * *